US012554007B2

(12) United States Patent
Zhang et al.

(10) Patent No.: US 12,554,007 B2
(45) Date of Patent: Feb. 17, 2026

(54) CONTROLLING DEVICE AND PROCESSING SETTINGS BASED ON RADIO FREQUENCY SENSING

(71) Applicant: QUALCOMM Incorporated, San Diego, CA (US)

(72) Inventors: Xiaoxin Zhang, Sunnyvale, CA (US); Qi Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 853 days.

(21) Appl. No.: 17/336,106

(22) Filed: Jun. 1, 2021

(65) Prior Publication Data

US 2022/0381898 A1   Dec. 1, 2022

(51) Int. Cl.
G01S 13/86      (2006.01)
G01S 7/00       (2006.01)
G01S 7/52       (2006.01)
G01S 13/04      (2006.01)
G01S 13/06      (2006.01)

(52) U.S. Cl.
CPC ............ *G01S 13/867* (2013.01); *G01S 7/003* (2013.01); *G01S 7/52046* (2013.01); *G01S 13/04* (2013.01); *G01S 13/06* (2013.01)

(58) Field of Classification Search
CPC .... G01S 13/867; G01S 7/003; G01S 7/52046; G01S 13/04; G01S 13/06
See application file for complete search history.

(56) References Cited

U.S. PATENT DOCUMENTS

| 9,288,471 | B1* | 3/2016 | Yang ................... G01B 11/245 |
| 10,509,479 | B2 | 12/2019 | Molchanov et al. | |
| 10,579,150 | B2 | 3/2020 | Gu et al. | |
| 10,761,611 | B2 | 9/2020 | Giusti et al. | |
| 11,361,060 | B1* | 6/2022 | Lyman ................ H04L 12/2829 |
| 2011/0143779 | A1* | 6/2011 | Rowe ................ H04M 3/42348 455/456.3 |
| 2011/0279663 | A1* | 11/2011 | Fan ........................ G06V 40/28 382/103 |
| 2012/0280900 | A1* | 11/2012 | Wang .................... G06F 3/0488 345/156 |
| 2013/0235203 | A1 | 9/2013 | Billington et al. | |

(Continued)

FOREIGN PATENT DOCUMENTS

WO      2019005936 A1    1/2019

OTHER PUBLICATIONS

International Search Report and Written Opinion—PCT/US2022/030753—ISA/EPO—Oct. 7, 2022.

*Primary Examiner* — Charles N Appiah
*Assistant Examiner* — Nicole M Louis-Fils
(74) *Attorney, Agent, or Firm* — QUALCOMM Incorporated

(57) ABSTRACT

Disclosed are systems and techniques for extended reality optimizations using radio frequency (RF) sensing. An example method can include obtaining RF sensing data; determining, based on the RF sensing data, reflected paths of one or more reflected RF signals, each reflected RF signal including a reflection of a transmitted signal from one or more objects in physical space; comparing the one or more reflected paths, to a field-of-view (FOV) of an image sensor of the device; and based on the comparison, triggering an action by the device and/or the image sensor.

49 Claims, 10 Drawing Sheets

(56) References Cited

U.S. PATENT DOCUMENTS

| | | | |
|---|---|---|---|
| 2016/0283804 A1* | 9/2016 | Furman | G01C 21/30 |
| 2017/0097413 A1* | 4/2017 | Gillian | G01S 7/4004 |
| 2017/0228048 A1* | 8/2017 | Miura | G06F 3/0481 |
| 2018/0082135 A1* | 3/2018 | Crawford | H04N 7/181 |
| 2018/0372844 A1 | 12/2018 | Jungmaier et al. | |
| 2021/0025976 A1* | 1/2021 | Chandel | G01S 13/88 |

* cited by examiner

CONTROLLING DEVICE AND PROCESSING SETTINGS BASED ON RADIO FREQUENCY SENSING

TECHNICAL FIELD

The present disclosure generally relates to radio frequency sensing. For example, aspects of the present disclosure relate to controlling device and/or processing settings based on radio frequency sensing.

BACKGROUND

Wireless electronic devices can provide various wireless services such as, for example, geolocation, mapping, and route-finding, among others. In order to implement various wireless functions, wireless electronic devices can include hardware and software components configured to transmit and receive radio frequency (RF) signals. For example, a wireless electronic device can be configured to communicate via Wi-Fi, 5G/New Radio (NR), Bluetooth™, and/or ultra-wideband (UWB), among others.

In some cases, wireless electronic devices can also implement digital cameras to capture videos and/or images. For example, wireless devices such as phones, connected vehicles, computers, gaming systems, wearable devices, smart home assistants, etc., are often equipped with cameras. The cameras allow the electronic device to capture videos and/or images. The videos and/or images can be captured for recreational use, professional photography, surveillance, extended reality, and automation, among other applications. Moreover, cameras are increasingly equipped with specific functionalities for modifying and/or manipulating videos and/or images for a variety of effects and/or applications. For example, many cameras are equipped with video/image processing capabilities for detecting objects on captured images, generating different image and/or video effects, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for controlling device and/or processing settings based on radio frequency (RF) sensing. According to at least one example, a method is provided for controlling device and/or processing settings based on RF sensing. The method can include obtaining radio frequency (RF) sensing data; determining, based on the RF sensing data, one or more reflected paths of one or more reflected RF signals, wherein each reflected RF signal comprises a reflection of a transmitted RF signal from one or more objects in a physical space; comparing the one or more reflected paths to a field-of-view (FOV) of an image capturing device associated with a mobile device; and based on the comparison, triggering an action by at least one of the image capturing device and the mobile device.

According to at least one example, a non-transitory computer-readable medium is provided for controlling device and/or processing settings based on RF sensing. The non-transitory computer-readable medium can include instructions which, when executed by one or more processors, cause the one or more processors to: obtain radio frequency (RF) sensing data; determine, based on the RF sensing data, one or more reflected paths of one or more reflected RF signals, wherein each reflected RF signal comprises a reflection of a transmitted RF signal from one or more objects in a physical space; compare the one or more reflected paths to a field-of-view (FOV) of an image capturing device associated with the apparatus; and based on the comparison, trigger an action by at least one of the image capturing device and the apparatus.

According to at least one example, an apparatus is provided for controlling device and/or processing settings based on RF sensing. The apparatus can include memory and one or more processors coupled to the memory, the one or more processors being configured to obtain radio frequency (RF) sensing data; determine, based on the RF sensing data, one or more reflected paths of one or more reflected RF signals, wherein each reflected RF signal comprises a reflection of a transmitted RF signal from one or more objects in a physical space; compare the one or more reflected paths to a field-of-view (FOV) of an image capturing device associated with the apparatus; and based on the comparison, trigger an action by at least one of the image capturing device and the apparatus.

According to at least one example, another apparatus is provided for controlling device and/or processing settings based on RF sensing. The apparatus can include means for obtaining radio frequency (RF) sensing data; determining, based on the RF sensing data, one or more reflected paths of one or more reflected RF signals, wherein each reflected RF signal comprises a reflection of a transmitted RF signal from one or more objects in a physical space; comparing the one or more reflected paths to a field-of-view (FOV) of an image capturing device associated with the apparatus; and based on the comparison, triggering an action by at least one of the image capturing device and the apparatus.

In some aspects, the method, non-transitory computer-readable medium, and apparatuses described above can determine, based on the comparison, that the one or more objects are outside of the FOV of the image capturing device; and based on determining that the one or more objects are outside of the FOV of the image capturing device, set a power setting of the image capturing device to an adjusted power state that is lower than a different power state associated with the image capturing device when the one or more objects are within a portion of a scene corresponding to the FOV of the image capturing device.

In some aspects, the method, non-transitory computer-readable medium, and apparatuses described above can determine that the one or more objects are moving towards the portion of the scene corresponding to the FOV of the image capturing device; and based on determining that the one or more objects are moving towards the portion of the scene corresponding to the FOV of the image capturing device, adjust the power setting of the image capturing device to the different power state.

In some aspects, the method, non-transitory computer-readable medium, and apparatuses described above can determine that a view of the image capturing device to the one or more objects is obstructed by at least one object; and based on determining that the view of the image capturing device to the one or more objects is obstructed by at least one object, set a power setting of the image capturing device to an adjusted power state that is lower than a different power state associated with the image capturing device when the one or more objects are within a portion of a scene corresponding to the FOV of the image capturing device, wherein triggering the action is further based on the determining that the view of the image capturing device to the one or more objects is obstructed.

In some examples, determining that the view of the image capturing device to the one or more objects is obstructed by at least one object further comprises: determining, based on the comparison, that the one or more objects are within the portion of the scene corresponding to the FOV of the image capturing device; and determining, based on a location of the one or more objects, that a view of the image capturing device to the one or more objects is obstructed by the at least one object.

In some examples, the image capturing device comprises a plurality of image sensors. In some cases, the triggered action comprises controlling a power setting of the image capturing device, and controlling the power setting of the image capturing device further comprises controlling individual power settings of the plurality of image sensors.

In some examples, controlling individual power settings of the plurality of image sensors further comprises dedicating, based on determining that a hand is within an FOV of a particular one of the plurality of image sensors, at least one of a plurality of processors of the mobile device to the particular one of the plurality of image sensors for image processing.

In some aspects, the method, non-transitory computer-readable medium, and apparatuses described above can control, based on determining that the one or more objects are outside of the FOV of the image capturing device, a use of a plurality of image capturing devices of the mobile device by a plurality of processors of the mobile device, the plurality of image capturing devices including the image capturing device.

In some aspects, the method, non-transitory computer-readable medium, and apparatuses described above can determine that the one or more objects are outside of the FOV of the image capturing device and moving towards a portion of a scene corresponding to the FOV of the image capturing device; and in response to determining that the one or more objects are outside of the FOV of the image capturing device and moving towards the portion of the scene corresponding to the FOV of the image capturing device, switch an active camera setting from the image capturing device to a different image capturing device. In some cases, the switched active camera setting can trigger the mobile device to use the different image capturing device to capture one or more images.

In some examples, at least one of the one or more objects comprises a hand associated with a user of the mobile device.

In some aspects, the method, non-transitory computer-readable medium, and apparatuses described above can determine paths of RF signals comprising a direct path of the transmitted RF signal; and determine a location of the one or more objects relative to the mobile device based on the paths of the RF signals.

In some aspects, the method, non-transitory computer-readable medium, and apparatuses described above can determine, based on the one or more reflected paths, a location of the one or more objects relative to the mobile device. In some cases, determining the location of the one or more objects further comprises determining at least one of a respective distance, a respective azimuth angle, and a respective elevation angle associated with the one or more reflected paths.

In some cases, the triggered action comprises controlling a power setting of the image capturing device. In some examples, controlling the power setting of the image capturing device is further based on a light level being below a threshold. In some examples, controlling the power setting of the image capturing device is further based on a privacy setting. In some examples, the privacy setting is based on a user input, application data, and/or global navigation satellite system (GNSS) data.

In some aspects, the method, non-transitory computer-readable medium, and apparatuses described above can determine, based on the RF sensing data and the one or more reflected paths, at least one of a size and shape of the one or more objects.

In some aspects, the method, non-transitory computer-readable medium, and apparatuses described above can determine, based on the RF sensing data and the one or more reflected paths, a shape of an object from the one or more objects; determine, based on the shape of the object, that the object comprises a hand associated with a user of the mobile device; and generate, using an image captured by the image capturing device, a cropped image of the hand.

In some aspects, the method, non-transitory computer-readable medium, and apparatuses described above can determine a location of the one or more objects relative to the mobile device based on the one or more reflected paths. In some cases, the cropped image is generated based on the location of the one or more objects, and the location of the one or more objects comprises a hand location.

In some aspects, the method, non-transitory computer-readable medium, and apparatuses described above can select the at least one of the one or more reflected paths from the one or more reflected paths based on a respective distance of an associated object being within a distance threshold.

In some aspects, the method, non-transitory computer-readable medium, and apparatuses described above can send the cropped image to a destination device. In some examples, the destination device comprises at least one of server and a mobile device. In some cases, the mobile device comprises an extended reality device.

In some examples, at least one of the one or more objects comprises a hand of a user of the mobile device. In some aspects, the method, non-transitory computer-readable medium, and apparatuses described above can determine, based on the RF sensing data and the one or more reflected paths, at least one of a map of the physical space and a hand gesture associated with the hand of the user.

In some cases, the triggered action comprises extracting a portion of an image that contains the one or more objects. In some cases, the triggered action comprises determining whether to capture one or more images of the one or more objects. In some examples, the triggered action is further based on a determination that the one or more objects are within a portion of a scene corresponding to the FOV of the image capturing device.

In some aspects, the method, non-transitory computer-readable medium, and apparatuses described above can detect, using a machine learning algorithm, at least one of a hand associated with a user of the mobile device and an obstruction of a view of the image capturing device to the hand. In some examples, the hand comprises at least one of the one or more objects.

In some aspects, the apparatus is or is part of a mobile device (e.g., a mobile telephone or "smart phone" or other mobile device), a wearable device (e.g., a head mounted display), an extended reality device (e.g., a virtual reality (VR) device, an augmented reality (AR) device, or a mixed reality (MR) device), a tablet, a personal computer, a laptop computer, a server computer, a wireless access point, or other any other device having an RF interface. In some aspects, the apparatuses described above can include a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, an orientation of the apparatuses, and/or for any other purpose.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
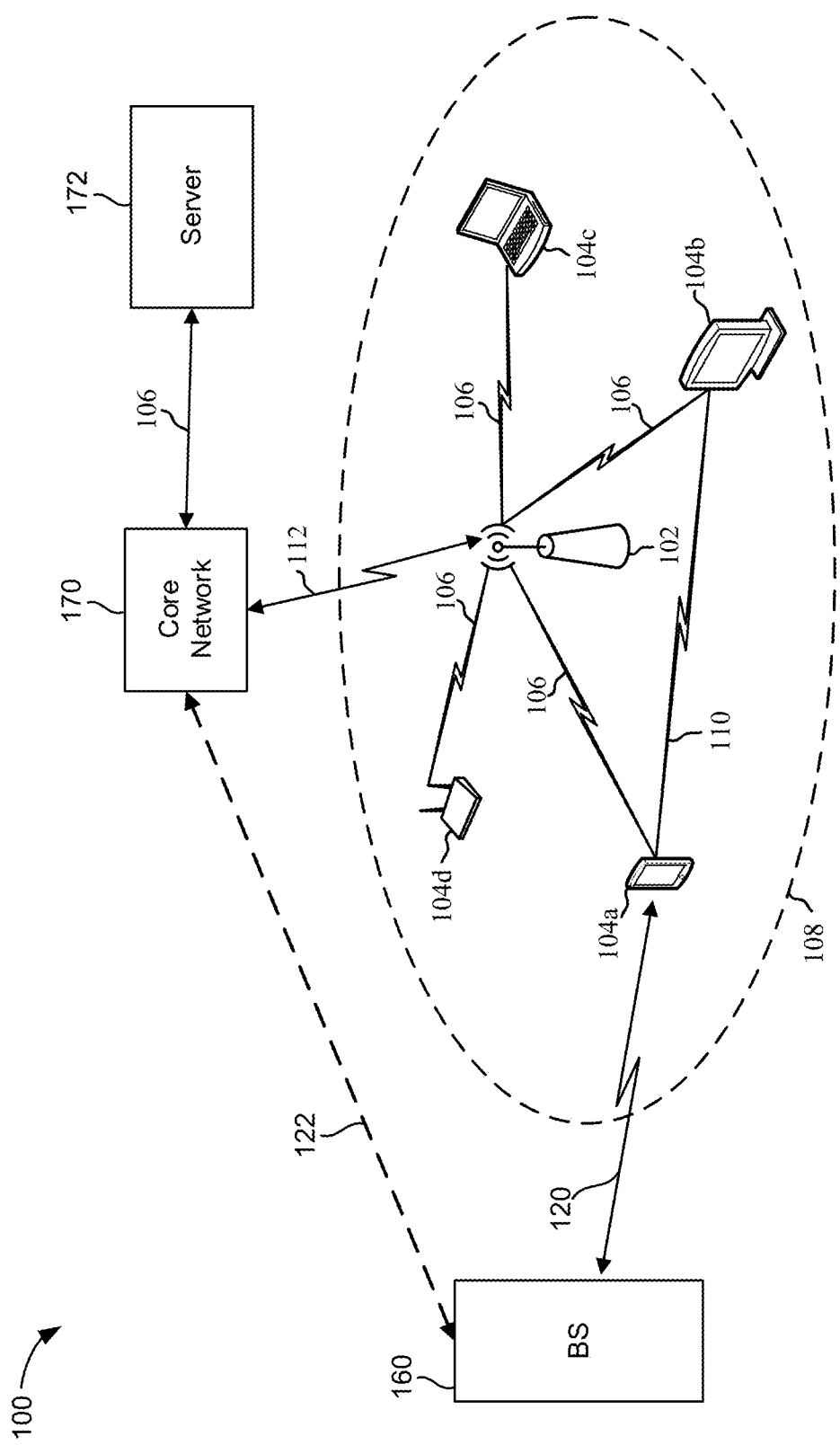
FIG. 1 illustrates an example of a wireless communication network, in accordance with some examples of the present disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

As previously noted, wireless electronic devices can provide various wireless and other services such as, for example and without limitation, geolocation, mapping, extended reality, image processing, and route-finding, among others. Non-limiting examples of wireless electronic devices can include mobile phones, wearable devices, smart home assistants, televisions, connected vehicles, game systems, Internet-of-Things (IoT) devices, cameras, tablet computers, laptop computers, etc. To implement wireless functions, wireless electronic devices can include hardware and software components configured to transmit and receive radio frequency (RF) signals. For example, a wireless electronic device can be configured to communicate via Wi-Fi, 5G/New Radio (NR), Bluetooth™, and/or ultra-wideband (UWB), among others. In some cases, wireless electronic devices can also implement digital cameras to capture videos and/or images.

For example, wireless devices (e.g., mobile phones, wearable devices, connected vehicles, laptop computers, tablet computers, IoT devices, game systems, smart home assistants, cameras, etc.) are often equipped with cameras. The cameras allow the electronic device to capture videos and/or images. The videos and/or images can be captured for recreational use, professional photography, surveillance, extended reality, and automation, among other applications. Moreover, camera devices are increasingly equipped with functionalities for modifying and/or manipulating videos and/or images for a variety of effects and/or applications. For example, camera devices can be equipped with video/image processing capabilities for detecting objects on captured images, generating image and/or video effects, rendering videos/images, etc.

In some examples, cameras can be implemented in electronic devices for extended reality (XR). XR technologies can include augmented reality (AR), virtual reality (VR), mixed reality (MR), and the like. XR technologies can combine real environments from the physical world (e.g., the real world) and virtual environments or content to provide users with XR experiences. The XR experiences allow users to interact with a real or physical environment enhanced or augmented with virtual content and vice versa. XR technologies can be implemented to provide functionalities and/or enhance user experiences in a wide range of contexts such as, for example, healthcare, retail, education, social media, entertainment, and so forth.

To provide realistic XR experiences, XR technologies can integrate virtual content with the physical world. In some examples, this can involve generating a map of the real-world environment and determining or calculating a particular pose of the user's XR device relative to the map of the real-world environment in order to anchor virtual content to the real-world environment in a convincing manner. The pose information can be used to match virtual content with the user's perceived motion and the spatio-temporal state of the real-world environment.

XR devices and other electronic devices such as, for example, smartphones, tablets, laptops, among others, can include wireless capabilities and can often perform functions such as geolocation, mapping, and/or route-finding, among others. In some cases, an XR device can send a tracking frame and sensor measurements (e.g., inertial measurement unit (IMU) measurements, etc.) captured at the XR device to a destination device associated with the XR device, such as a mobile device (e.g., smartphone), a server (e.g., an edge server, cloud server, etc.), and/or other device. The XR device may be a wearable device configured to be worn by a user. In some aspects the XR device may be configured to be worn on the head of a user, such as a head-mounted display (HMD), smart glasses, XR or AR glasses, or the like. The tracking frame can include an image captured by a camera at the XR device, which is associated with the field-of-vision of the user, e.g., by pointing the camera, i.e. arranging the camera at the XR device to point, in the general direction of the user's vision. The tracking frame can be used by the destination device (e.g., the mobile device or the server) to detect hand gestures, perform hand and controller tracking, etc.

However, the process of capturing the tracking frame and transmitting the tracking frame to the destination device can consume a significant amount of network and device resources. For example, the process of capturing and transmitting the tracking frame can increase the power consumption at the XR device. Moreover, the tracking frame from the XR device can be large and can significantly increase uplink (UL) traffic requirements/usage for (UL) transmission to the destination device (e.g., the mobile device or the server).

In some cases, using the tracking frame to detect hand gestures and track hands and other objects can have several challenges and/or limitations. For example, the tracking frame may not enable hand tracking when the hands are outside of the field-of-view (FOV) of the camera at the XR device, such as when the hands are behind the user's body or in the user's pocket. However, in this scenario, even a rough estimate of the hand location would help predict a future hand position and perform smoother hand tracking.

Reducing the size of the tracking frame can reduce UL airtime, XR device power consumption, contention with downlink (DL) traffic, and/or other improvements. In some examples, the size of the tracking frame can be reduced using computer vision to process the tracking frame and estimate a (coarse) location of the hands in the tracking frame. With this approach, the XR device can reduce the size of the tracking frame sent to the destination device by only sending a partial frame containing the hand(s). However, implementing computer vision at the XR device to estimate a (coarse) location of the hand(s) in the tracking frame can significantly increase power consumption at the XR device.

Moreover, camera device components implemented by an electronic device to capture images (also referred to as frames) can increase the power consumption at the electronic device. In many cases, some electronic devices, such as mobile devices (e.g., XR devices, Internet Protocol (IP) cameras, smartphones, wearable devices, smart home assistants, tablet computers, laptop computers, IoT devices, etc.), may have more limited battery/power capabilities than other devices, and can be more significantly impacted by the power consumption of the camera device components. The power consumption at the electronic device can often have an even greater impact on the battery life of the electronic device in cases where the electronic device performs additional and/or more compute-intense operations. For example, in some cases, an XR device may not send image data (e.g., a tracking frame, etc.) or sensor measurements to a destination device to offload certain operations (e.g., hand gesture detection, object detection, hand tracking, controller tracking, etc.) as previously described, but rather use the image data and sensor measurements to perform such operations at the XR device. In such cases, the additional operations performed at the XR device (e.g., relative to implementations where such operations are offloaded to a destination device) can increase the power consumption at the XR device and thus the impact of the battery/power constraints/limitations at the XR device.

As further described herein, in some examples, an electronic device can reduce its power consumption by reducing and/or limiting unnecessary power and/or resource usage of camera device components. Such reduction in power consumption can increase the battery life of the electronic device and can be advantageous given the limited battery/power capabilities of electronic devices, such as in scenarios where the electronic device is an XR device and does not offload (or offloads less) operations to a destination device as previously described. For example, to reduce the power consumption at an XR device, the XR device can control the settings of camera device components at the XR device in order to reduce and/or increase their power consumption levels depending on whether an object(s) of interest in a scene is visible by the camera device.

To illustrate, if an object of interest is not visible to a camera device of the XR device (e.g., is outside of a field-of-view of the camera device and/or is occluded by another object(s), etc.), the XR device can turn off the camera device or reduce a power mode of the camera device to avoid unnecessary power consumption by the camera device while the camera device is unable to capture an image of the object. If the object of interest is within (or nearing within a threshold estimated timeframe, proximity, and/or trajectory) the field-of-view of the camera device and not occluded by another object(s), the XR device can turn on the camera device or increase a power mode of the camera device to allow (or better allow) the camera device to capture an image of the object.

Systems and techniques are described herein for reducing the amount of network and/or device resources used by a device, such as an XR device (e.g., a head-mounted display, smart glasses, etc.), in a number of applications such as, for example, XR, automation, image/video processing, etc. In some examples, the systems and techniques described herein can reduce the amount/size of UL traffic from an XR device to a destination device, such as a mobile device or a server. For example, the systems and techniques described herein can enable hand gesture detection and/or hand and object tracking without a full tracking frame from the XR device.

In some examples, the XR device can use radio frequency (RF) sensing to detect the location of at least one hand of the user. The XR device can use the detected location of the user's hand(s) to create a partial frame, i.e. only part of the captured (full) tracking frame, containing the user's hand(s), and send the partial frame to the destination device instead of sending a full tracking frame. The destination device can use the partial frame to detect a hand gesture, track the user's hand(s), and/or detect any other objects in a scene, such as an XR controller. The partial frame can be smaller than a full tracking frame. Thus, by sending the partial frame instead of the full tracking frame, the XR device can reduce the size of the UL traffic to the destination device and overall network usage.

RF sensing can use RF data to generate a map of a space, such as a space in a scene or an indoor space. In some cases, using a monostatic configuration, a wireless device (e.g., XR device, smartphone, etc.) can obtain RF sensing data using wireless interfaces that are capable of performing transmit and receive functions. In some examples, the wireless device can implement a Wi-Fi radar to obtain the RF sensing data. The Wi-Fi radar can implement RF interfaces capable of performing transmit and receive functions. The Wi-Fi radar (and/or the wireless device implementing the Wi-Fi radar) can use the signal strength of radio transmissions to determine a location/position of one or more objects. For example, a wireless device may utilize a wireless interface (e.g., of a Wi-Fi radar) to transmit an RF signal and capture any signals that reflect from objects in the surrounding environment. The wireless interface can also receive leakage signals that are coupled directly from the transmitter's antenna to the receiver's antenna without reflecting from any objects. In some examples, the wireless device may gather RF sensing data in the form of channel state information (CSI) data relating to the direct paths (leakage signals) of the transmitted signal and data relating to the reflected paths of the signals received that correspond to the transmitted signal. In some cases, a bistatic configuration can be used where the transmit and receive functions are performed by different devices. For instance, a first device can transmit wireless signals that reflect from one or more objects in the scene, and a wireless interface of a second device can receive the reflected signals and/or signals directly from the first device. In some cases, the signals can be omnidirectional signals transmitted using an omnidirectional antenna, and the signals can be transmitted in a 360-degree radiation pattern.

The CSI data can describe how a wireless signal propagates from a transmitter to a receiver. The CSI data can represent the combined effect of scattering, fading, and power decay with distance, and can show the channel properties of a communication link. The CSI data collected can reflect the varying multipath reflection induced by any moving objects due to its frequency diversity. In some examples, the CSI data can include I/Q numbers for each tone in the frequency domain for the bandwidth. Changes in certain CSI properties can be used to detect motion, estimate a change in location, determine a change in a motion pattern, etc.

In some examples, the CSI data can be used to determine or calculate the distance of the reflected signals as well as the angle of arrival. In some cases, the CSI data can be used to determine a distance, azimuth and/or elevation of one or more paths of one or more reflected signals. The distance, azimuth, and/or elevation of the one or more paths of the one or more reflected signals can be used to identify the size, shape, and/or position of one or more objects in the surrounding environment. The size, shape, and/or position of the one or more objects can be used to control one or more resources (e.g., power resources, sensor resources, processor resources, etc.) of a device, generate an indoor map, track the one or more objects, etc. In one example, the distance of reflected signals can be determined by measuring the difference in time from reception of the leakage signal to the reception of the reflected signals. In another example, the angle of reflection can be determined by using an antenna array to receive the reflected signals and measuring the difference in the received phase at each element of the antenna array.

In some cases, with RF sensing, a system can use signal processing to extract reflections and focus on the reflection paths that are short in distance (e.g., within a threshold distance, such as 1.5 m or 1 m, as certain objects of interest such as hands are generally close to the XR device) and/or shorter in distance relative to a direct path, to reduce the computational complexity and/or power consumption at the XR device. The RF sensing can be used to estimate the dimension of an object that causes the reflections. An object classification algorithm (e.g., signal processing, machine learning, etc.) can be used to classify the detected object. For example, an object classification algorithm can be used to classify a detected object as a hand or as not hand (or as having one or more classifications other than a hand). When omnidirectional signals are transmitted, the RF sensing can track 360 degrees and is not limited by camera view. Accordingly, RF sensing can be used to track objects (e.g., hands, etc.) outside of the camera view. In some examples, RF sensing can track objects even without a tracking frame, and can provide an estimation of the object's location. The XR device can send the RF sensing information to a destination device (e.g., a smartphone or server) to help predict a future object position and/or achieve smooth object tracking.

In some examples, the XR device can receive an RF sensing frame including a downlink physical layer protocol data unit (DL-PPDU) from a destination device (e.g., smartphone, server, etc.) or a Wi-Fi radar signal. The XR device can estimate the CSI information from the RF sensing frame. The XR device can process the CSI information and extract direct and reflected paths of RF signals associated with the RF sensing frame. The direct path can be extracted even without a line-of-sight (LOS) and can be detected even through certain barriers such as objects or walls. In some cases, the direct path of a DL-PPDU can be from the destination device (e.g., the smartphone or server) to the XR device. In some cases, the direct path of the Wi-Fi radar signal can be from a Tx antenna(s) to an Rx antenna(s) in the XR device (monostatic configuration). In other cases, the direct path of the Wi-Fi radar signal can be from a Tx antenna(s) of the destination device or another device to an Rx antenna(s) of the XR device (bistatic configuration).

In some examples, the XR device can select the reflected paths that are shorter in distance relative to the direct path (e.g., or within a threshold distance, such as 1.5 m or 1 m) and estimate the distance, azimuth and elevation of each selected reflected path with regard to an RF sensing coordinate system. The XR device can use the distance, azimuth and elevation of each selected reflected path to detect an object(s) in physical space and measure the dimension of each detected object. In some examples, the distance, azimuth and elevation (and/or angle thereof) of each selected reflected path can be determined or calculated based on an estimated time-of-flight and an estimated angle of arrival of a reflected signal associated with each reflected path.

In some aspects, the XR device can use an object classification algorithm (e.g., signal processing, machine learning) to classify a detected object. For example, the XR device can use an object classification algorithm to classify a detected object(s) as a body part (e.g., hand, finger, leg, foot, etc.), an input device (e.g., a stylus, a controller, a ring, a glove, a mouse, a keyboard, a joystick, a knob, a bodysuit, mat or treadmill, a ball, etc.), or any other object. In some cases, the XR device can detect one or more visual markers (e.g., visual features, patterns, codes, properties, etc.) on an object, such as an input device, and use the one or more visual markers to classify the object using an object classification algorithm. In some examples, the XR device can use an object classification algorithm to classify if a detected object is a hand or not. The XR device can perform a camera calibration to align the camera image coordinate system with the RF sensing coordinate system. The camera image coordinate system can be from the field-of-view (FOV) of a camera at the XR device based on the camera location and pose of the XR device. In some examples, the XR device can use sensor data (with or without other data), such as data from an inertial measurement unit (IMU), to calculate a pose of the XR device. In some cases, the XR device can use the pose of the XR device to calculate reference coordinates of the XR device's FOV and/or refine an object's position (e.g., hand position, input device position, etc.) calculated using RF sensing.

The RF sensing coordinate system can be based on the antenna location and the pose of the XR device. In case of a fixed spatial relationship between the RF sensing component(s), e.g., the Rx antenna(s) at the XR device, and the camera (generally both mounted on the XR device), the pose of the XR device may be omitted when deriving the above-mentioned coordinate systems. The XR device can determine the location of a detected object classified as a hand, and use the location of the hand to generate a partial image that captures/contains the detected hand. In some examples, the XR device can use the location of the hand to crop an image of the hand captured by the camera to generate the partial image (e.g., a cropped image of the hand). The XR device can send the partial image in an UL packet to a destination device. The destination device can use the partial image to detect a hand gesture, track the hand, and/or track other objects such as one or more input devices (e.g., a controller, a stylus, a ring, a glove, a mouse, a keyboard, a joystick, a knob, a bodysuit, mat or treadmill, a ball, etc.).

In some examples, the XR device can use the RF sensing data to determine whether a detected hand is occluded by one or more objects and/or whether the detected hand is outside of a FOV of the camera of the XR device. For example, the XR device can determine whether the detected hand is under a table that occludes the hand from the camera's FOV. As another example, the XR device can determine whether the hand is behind the user's back and outside of the camera's FOV. In some cases, when the hand is determined to be occluded and/or outside of the camera's FOV, the XR device can control a power setting of the camera to reduce a power consumption of the XR device. For example, the XR device can turn off the camera or place the camera in a lower power mode while the hand is occluded or outside of the camera's FOV. The XR device can turn the camera back on or place the camera in a higher power mode if it later determines that the hand is no longer occluded or outside of the camera's FOV. In some cases, the XR device can use RF sensing to detect a movement of a hand(s) and prepare the camera to take one or more images to capture a hand gesture if the movement indicates that the hand(s) is approaching the camera's FOV. In some cases, when the hand is determined to be occluded or otherwise outside of the camera's FOV, the XR device can use the RF sensing data to generate a sparse map of the physical space associated with the XR device.

In some cases, the XR device may determine and store device position data and device orientation data. In some instances, the XR device position data and device orientation data can be used to adjust the calculations for the distance and angle of reflection of reflected signals (determined using the CSI data) if the device is in motion. For example, the position and orientation data can be used to correlate one or more reflected signals with their corresponding transmitted signal. In some examples, device position or location data can be gathered using techniques that measure round trip time (RTT), Passive Positioning, Angle of Arrival (AoA), Received Signal Strength Indicator (RSSI), using the CSI data, using any other suitable technique, or any combination thereof. The device orientation data can be obtained from electronic sensors on the XR device, such as one or more gyroscopes, accelerometers, compasses, any other suitable sensor, or any combination thereof.

Various aspects of the techniques described herein will be discussed below with respect to the figures. FIG. 1 is a block diagram of an example communication system 100. According to some aspects, the communication system 100 can include a wireless local area network (WLAN) 108, such as a Wi-Fi network. For example, the WLAN 108 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

WLAN 108 may include numerous wireless communication devices such as an access point (AP) 102 and user equipment (UEs) 104a, 104b, 104c, and 104d (collectively "UEs 104"). While only one AP 102 is shown, the WLAN 108 also can include multiple APs 102. In general, a UE may be any wireless communication device (e.g., a mobile phone, router, tablet computer, laptop computer, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof. Generally, UEs can communicate with a core network via a RAN, and through the core network the UEs can be connected with external networks such as the Internet and with other UEs. UEs can also communicate with other UEs and/or other devices as described herein.

An AP 102 and an associated set of UEs 104 may be referred to as a basic service set (BSS), which is managed by the respective AP 102. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any UEs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various UEs 104 in the WLAN via respective communication links 106.

To establish a communication link 106 with an AP 102, each of the UEs 104 is configured to perform passive or active scanning operations ("scans") on frequency channels in one or more frequency bands (for example, the 2.4 GHz, 5 GHz, 6 GHz or 60 GHz bands). To perform passive scanning, UEs 104 listen for beacons, which are transmitted by respective APs 102 at a periodic time interval referred to as the target beacon transmission time (TBTT) (measured in time units (TUs) where one TU may be equal to 1024 microseconds (μs)). To perform active scanning, UEs 104 generate and sequentially transmit probe requests on each channel to be scanned and listens for probe responses from APs 102. Each UE 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the UEs 104 at the culmination of the association operations, which the AP 102 uses to track UEs 104.

Given the increasing ubiquity of wireless networks, UEs 104 may have the opportunity to select one of many BSSs within range of the UE or to select among multiple APs 102 that together form an extended service set (ESS) including multiple connected BSSs. An extended network station associated with the WLAN 108 may be connected to a wired or wireless distribution system that may allow multiple APs 102 to be connected in such an ESS. As such, a UE 104 can be covered by more than one AP 102 and can associate with different APs 102 at different times for different transmissions. Additionally, after association with an AP 102, a UE 104 also may be configured to periodically scan its surroundings to find a more suitable AP 102 with which to associate. For example, a UE 104 that is moving relative to its associated AP 102 may perform a "roaming" scan to find another AP 102 having more desirable network characteristics such as a greater received signal strength indicator (RSSI) or a reduced traffic load.

In some cases, UEs 104 may form networks without APs 102 or other equipment other than the UEs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 108. In such implementations, while the UEs 104 may be capable of communicating with each other through the AP 102 using communication links 106, UEs 104 also can communicate directly with each other via direct wireless links 110. Additionally, two UEs 104 may communicate via one or more device-to-device (D2D) peer-to-peer (P2P) links referred to as "sidelinks." In the example of FIG. 1, UE 104*b* has a direct wireless link 110 (e.g., a D2D P2P link) with UE 104*a*, which is connected to one or more base stations 160 and permits UE 104*b* to indirectly obtain cellular connectivity. While a single base station 160 is illustrated in FIG. 1, the communication system 100 can include multiple base stations in communication with the UEs 104. In an example, the direct wireless link 110 may be supported with any well-known D2D RAT, such as LTE Direct (LTE-D), Wi-Fi Direct (WiFi-D), Bluetooth®, UWB, and so on.

The APs 102 and UEs 104 may function and communicate (via the respective communication links 106) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and UEs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and UEs 104 in the WLAN 108 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and UEs 104 described herein also may communicate in other frequency bands, such as the 6 GHz band, which may support both licensed and unlicensed communications. The APs 102 and UEs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz or 200 MHz by bonding together multiple 20 MHz channels.

In some examples, communication system 100 can include one or more base stations 160. The one or more base stations 160 may include macro cell base stations (high power cellular base stations) and/or small cell base stations (low power cellular base stations). In an aspect, the macro cell base station may include eNBs and/or ng-eNBs that corresponds to a 4G/LTE network, or gNBs that corresponds to a 5G/NR network, or a combination of both, and the small cell base stations may include femtocells, picocells, microcells, etc.

The one or more base stations 160 may collectively form a RAN and interface with a core network 170 (e.g., an evolved packet core (EPC) or a 5G core (5GC)) through backhaul links 122, and through the core network 170 to one or more servers 172 (which may be part of core network 170 or may be external to core network 170). In addition to other functions, the one or more base stations 160 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages.

The one or more base stations 160 may wirelessly communicate with the UEs, such as UE 104a, via communication link 120. The communication links 120 between the one or more base station 160 and the UEs 104 may include uplink (also referred to as reverse link) transmissions from a UE (e.g., UE 104a, 104b, 104c, and/or 104d) to the base station 160 and/or downlink (also referred to as forward link) transmissions from the base station 160 to one or more of the UEs 104. The communication links 120 may use MIMO antenna technology, including spatial multiplexing, beamforming, and/or transmit diversity. The communication links 120 may be through one or more carrier frequencies.

Each of the UEs 104 in communication system 100 may be configured to perform RF sensing functions for generating an indoor map. The RF sensing functions can be implemented using any of the RF interfaces present in UEs 104 that are capable of simultaneously transmitting and receiving RF signals. UEs 104 can transfer data related to indoor mapping (e.g., RF Sensing data, partial map data, location data, orientation data, etc.) by utilizing communication system 100.

In some examples, UEs 104 can communicate with one or more servers, such as server 172, as part of one or more services and/or functions. For example, the UEs 104 can communicate with server 172 as part of an XR experience. The server 172 can assist in one or more functions such as, for example, tracking, mapping, rendering, etc. Communication with server 172 can be made via core network 170, which may be accessed by UEs 104 by utilizing communications links with base station 160 or AP 102. AP 102 can access the core network, including server 172, via communications link 112.

Figure 2:
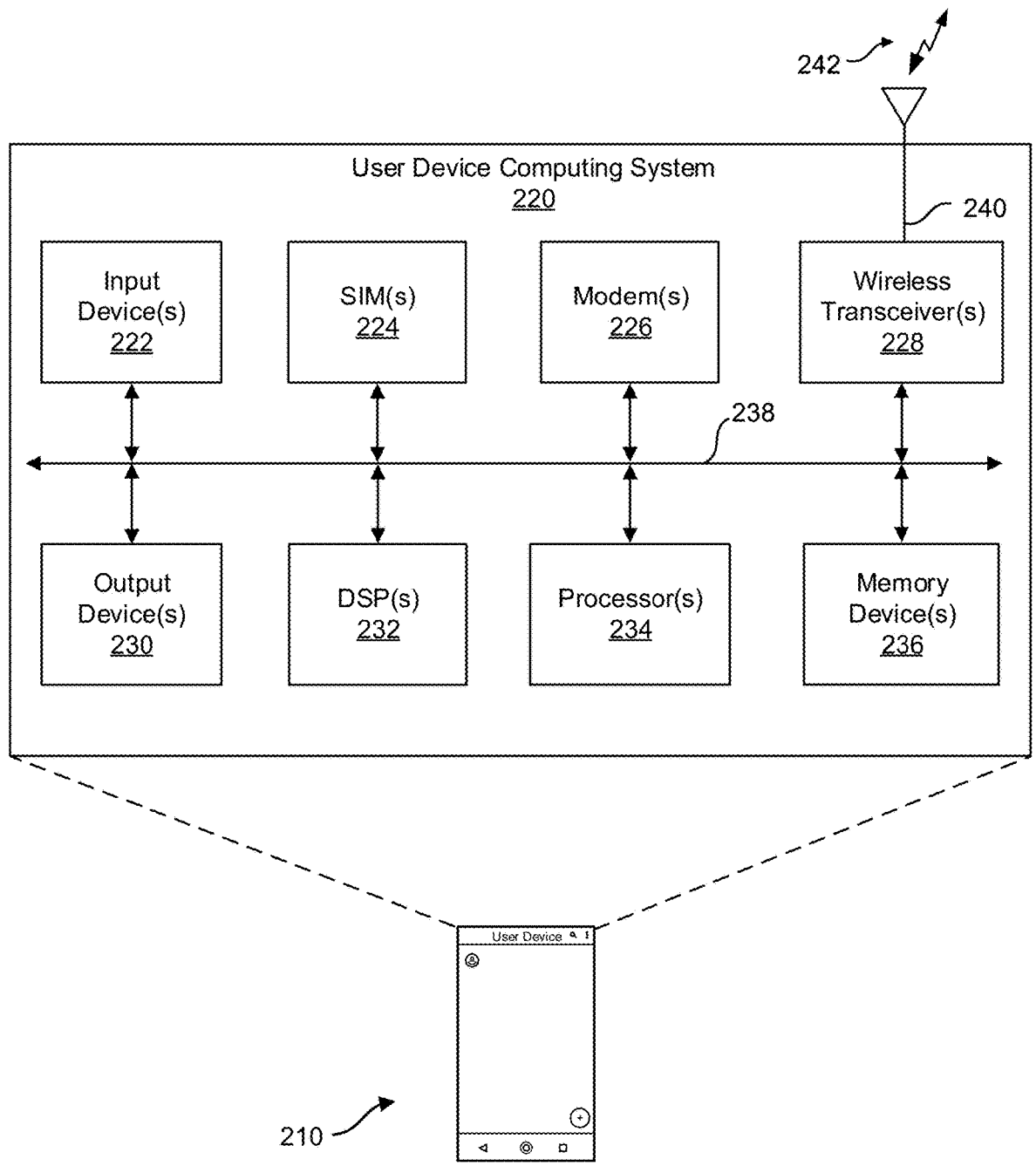
FIG. 2 is a block diagram illustrating an example of a computing system of a user device, in accordance with some examples of the present disclosure.

FIG. 2 is a diagram illustrating an example computing system 220 of a user device 210. In some examples, the user device 210 can be an example UE. For example, the user device 210 can include a mobile phone, router, tablet computer, laptop computer, wearable device (e.g., a smart watch, glasses, an XR device, etc.), Internet of Things (IoT) device, and/or another device used by a user to communicate over a wireless communications network.

The computing system 220 includes software and hardware components that can be electrically or communicatively coupled via a bus 238 (or may otherwise be in communication, as appropriate). For example, the computing system 220 can include one or more processors 234. The one or more processors 234 can include one or more central processing units (CPUs), image signal processors (ISPs), application-specific integrated circuits (ASICs), field-programmable gate arrays (FPGAs), application processors (Aps), graphics processing units (GPUs), digital signal processors (DSPs), vision processing units (VPUs), neural network signal processors (NSPs), microcontrollers, dedicated hardware, any combination thereof, and/or other processing device or system. The bus 238 can be used by the one or more processors 234 to communicate between cores and/or with the one or more memory devices 236.

The computing system 220 may also include one or more memory devices 236, one or more digital signal processors (DSPs) 232, one or more subscriber identity modules (SIMs) 224, one or more modems 226, one or more wireless transceivers 228, one or more antennas 240, one or more input devices 222 (e.g., a camera, a mouse, a keyboard, a touch sensitive screen, a touch pad, a keypad, a microphone, and/or the like), and/or one or more output devices 230 (e.g., a display, a speaker, a printer, and/or the like).

The one or more wireless transceivers 228 can receive wireless signals (e.g., signal 242) via antenna 240 from one or more other devices, such as other user devices, network devices (e.g., base stations such as eNBs and/or gNBs, Wi-Fi access points (APs) such as routers, range extenders or the like, etc.), cloud networks, and/or the like. In some examples, the computing system 220 can include multiple antennas or an antenna array that can facilitate simultaneous transmit and receive functionality. In some cases, antenna 240 can be an omnidirectional antenna such that RF signals can be received from and transmitted in all directions. The wireless signal 242 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the one or more wireless transceivers 228 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 242 into a baseband or intermediate frequency and can convert the RF signals to the digital domain.

In some cases, the computing system 220 can include a coding-decoding device (or CODEC) configured to encode and/or decode data transmitted and/or received using the one or more wireless transceivers 228. In some cases, the computing system 220 can include an encryption-decryption device or component configured to encrypt and/or decrypt data (e.g., according to the AES and/or DES standard) transmitted and/or received by the one or more wireless transceivers 228.

The one or more SIMs 224 can each securely store an international mobile subscriber identity (IMSI) number and related key assigned to the user of the user device 210. The IMSI and key can be used to identify and authenticate the subscriber when accessing a network provided by a network service provider or operator associated with the one or more SIMs 224. The one or more modems 226 can modulate one or more signals to encode information for transmission using the one or more wireless transceivers 228. The one or more modems 226 can also demodulate signals received by the one or more wireless transceivers 228 in order to decode the transmitted information. In some examples, the one or more modems 226 can include a Wi-Fi modem, a 4G (or LTE) modem, a 5G (or NR) modem, and/or other types of modems. The one or more modems 226 and the one or more wireless transceivers 228 can be used for communicating data for the one or more SIMs 224.

The computing system 220 can also include (and/or be in communication with) one or more non-transitory machine-readable storage media or storage devices (e.g., one or more memory devices 236), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In some examples, functions may be stored as one or more computer-program products (e.g., instructions or code) in memory device(s) 236 and executed by the one or more processor(s) 234 and/or the one or more DSPs 232. The computing system 220 can also include software elements (e.g., located within the one or more memory devices 236), including, for example, an operating system, device drivers, executable libraries, and/or other code, such as one or more application programs, which may include computer programs implementing the functions provided by various embodiments, and/or may be designed to implement methods and/or configure systems, as described herein.

Figure 3:
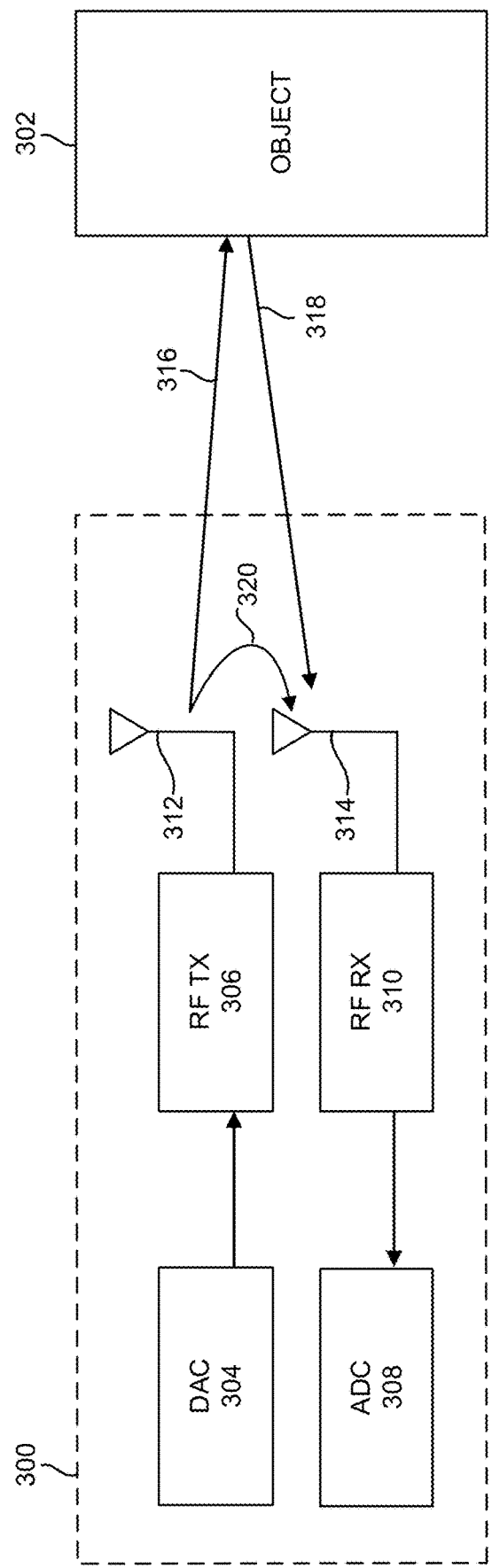
FIG. 3 is a diagram illustrating an example of a wireless device utilizing radio frequency sensing techniques to detect objects and/or object characteristics in an environment, in accordance with some examples of the present disclosure.

As noted above, systems and techniques are described herein for XR optimizations (e.g., optimizing XR operations/functions, devices/resources, settings, capabilities, etc.) using radio frequency (RF) sensing. FIG. 3 is a diagram illustrating an example of a wireless device 300 that utilizes RF sensing techniques to detect an object 302 in order to perform one or more XR optimizations as described herein. In some examples, wireless device 300 can be an XR device (e.g., an HMD, smart glasses, etc.), a mobile phone, a wireless access point, or some other device that includes at least one RF interface.

In some aspects, wireless device 300 can include one or more components for transmitting an RF signal. Wireless device 300 can include a digital-to-analog converter (DAC) 304 that is capable of receiving a digital signal or waveform (e.g., from a microprocessor, not illustrated) and converting the digital signal to an analog waveform. The analog signal that is the output of DAC 304 can be provided to RF transmitter 306. RF transmitter 306 can be a Wi-Fi transmitter, a 5G/NR transmitter, a Bluetooth™ transmitter, or any other transmitter capable of transmitting an RF signal.

RF transmitter 306 can be coupled to one or more transmitting antennas such as TX antenna 312. In some examples, TX antenna 312 can be an omnidirectional antenna that is capable of transmitting an RF signal in all directions. For example, TX antenna 312 can be an omnidirectional Wi-Fi antenna that can radiate Wi-Fi signals (e.g., 2.4 GHz, 5 GHz, 6 GHz, etc.) in a 360-degree radiation pattern. In another example, TX antenna 312 can be a directional antenna that transmits an RF signal in a particular direction.

In some examples, wireless device 300 can also include one or more components for receiving an RF signal. For example, the receiver lineup in wireless device 300 can include one or more receiving antennas such as RX antenna 314. In some examples, RX antenna 314 can be an omnidirectional antenna capable of receiving RF signals from multiple directions. In other examples, RX antenna 314 can be a directional antenna that is configured to receive signals from a particular direction. In further examples, both TX antenna 312 and RX antenna 314 can include multiple antennas (e.g., elements) configured as an antenna array.

Wireless device 300 can also include an RF receiver 310 that is coupled to RX antenna 314. RF receiver 310 can include one or more hardware components for receiving an RF waveform such as a Wi-Fi signal, a Bluetooth signal, a 5G/NR signal, or any other RF signal. The output of RF receiver 310 can be coupled to an analog-to-digital converter (ADC) 308. ADC 308 can be configured to convert the received analog RF waveform into a digital waveform that can be provided to a processor such as a digital signal processor (not illustrated).

In one example, wireless device 300 can implement RF sensing techniques by transmitting TX waveform 316 from TX antenna 312. Although TX waveform 316 is illustrated as a single line, in some examples, TX waveform 316 can be transmitted in all directions (e.g., 360 degrees) or multiple directions (e.g., via beamforming) by TX antenna 312. In one example, TX waveform 316 can be a Wi-Fi waveform that is transmitted by a Wi-Fi transmitter in wireless device 300. In some examples, TX waveform 316 can be implemented to have a sequence that has perfect or almost perfect autocorrelation properties. For instance, TX waveform 316 can include single carrier Zadoff sequences or can include symbols that are similar to orthogonal frequency-division multiplexing (OFDM) Long Training Field (LTF) symbols.

In some cases, wireless device 300 can implement RF sensing techniques by performing transmit and receive functions concurrently. For example, wireless device 300 can enable its RF receiver 310 to receive at or near the same time as it enables RF transmitter 306 to transmit TX waveform 316. In some examples, transmission of a sequence or pattern that is included in TX waveform 316 can be repeated continuously such that the sequence is transmitted a certain number of times or for a certain duration of time. In some examples, repeating a pattern in the transmission of TX waveform 316 can be used to avoid missing the reception of any reflected signals if RF receiver 310 is enabled after RF transmitter 306. In some examples, TX waveform 316 can include a sequence having a sequence length L that is transmitted two or more times, which can allow RF receiver 310 to be enabled at a time less than or equal to L in order to receive reflections corresponding to the entire sequence without missing any information.

By implementing simultaneous transmit and receive functionality, wireless device 300 can receive any signals that correspond to TX waveform 316. For example, wireless device 300 can receive signals that are reflected from objects that are within range of TX waveform 316, such as RX waveform 318 reflected from object 302. Wireless device 300 can receive leakage signals (e.g., TX leakage signal 320) that are coupled directly from TX antenna 312 to RX antenna 314 without reflecting from any objects. In some cases, RX waveform 318 can include multiple sequences that correspond to multiple copies of a sequence that are included in TX waveform 316. In some examples, wireless device 300 can combine the multiple sequences that are received by RF receiver 310 to improve the signal to noise ratio (SNR).

Although shown as a monostatic configuration in FIG. 3, the present disclosure is not limited to monostatic configurations. In some examples, the TX waveform 316 may be transmitted by a corresponding transmit chain (DAC, RF TX, antenna(s)) provided at a spatially separated transmitting device, such as the destination device. Information on the relative position and/or orientation of the wireless device 300 and the separate transmitting device, e.g., from a positioning process of the wireless device 300, may be determined at and/or communicated to the wireless device 300 to implement RF sensing techniques according to the present disclosure.

In some examples, wireless device 300 can implement RF sensing techniques by obtaining RF sensing data that is associated with each of the received signals corresponding to TX waveform 316. In some examples, the RF sensing data can include channel state information (CSI) data relating to the direct paths (e.g., leakage signal 320 or line-of-sight path) of TX waveform 316 and data relating to the reflected paths (e.g., RX waveform 318) that correspond to TX waveform 316.

In some cases, the RF sensing data (e.g., CSI data) can include information that can be used to determine the manner in which an RF signal (e.g., TX waveform 316) propagates from RF transmitter 306 to RF receiver 310. RF sensing data can include data that corresponds to the effects on the transmitted RF signal due to scattering, fading, and power decay with distance, or any combination thereof. In some examples, RF sensing data can include imaginary data and real data (e.g., I/Q components) corresponding to each tone in the frequency domain over a particular bandwidth.

In some examples, RF sensing data can be used to determine (e.g., calculate) distances and angles of arrival that correspond to reflected waveforms, such as RX waveform 318. In some examples, RF sensing data can be used to detect motion, determine location, detect changes in location or motion patterns, obtain channel estimation, determine characteristics of reflected paths of reflected waveforms (e.g., elevation, azimuth, distance, etc.), or any combination thereof. In some cases, the distance and angle of arrival of the reflected signals can be used to identify the size, shape, and/or position of objects in the surrounding environment (e.g., object 302). In some cases, the distance, azimuth, and/or elevation of reflected paths of reflected signals with regard to an RF sensing coordinate system can be used to determine a dimension (e.g., shape, size, etc.) and/or position of an object (e.g., object 302) in the surrounding environment. In some cases, the wireless device 300 can perform a camera calibration to align the camera image coordinate system of a camera device(s) with the RF sensing coordinate system. In some examples, the camera image coordinate system can be from the FOV of a camera device(s) at the wireless device 300, and can be based on the location of the camera device(s) and a pose of the wireless device 300. In some examples, the wireless device 300 can use sensor data (with or without other data), such as IMU data, to calculate the pose of the wireless device 300. In some examples, the wireless device 300 can use the pose of the XR device to calculate reference coordinates of the FOV of the wireless device 300 and/or refine an object's position (e.g., a hand position, an input device position, etc.) calculated using RF sensing.

In some examples, the dimension and/or position of the object can be used to determine whether the object is visible (e.g., within a FOV, not occluded, etc.) to an image capturing device (e.g., a camera device, image sensor, etc.) of the wireless device 300. In some cases, if the object is not visible to the image capturing device, the wireless device 300 can turn off or power down (e.g., to a lower power mode) the image capturing device. The wireless device 300 can maintain the image capturing device turned off or powered down until the object (or another object of interest) is/becomes visible to the image capturing device. This way, the image capturing device does not consume additional power (or consumes less power) during a period(s) when the image capturing device is unable to capture an image of an object(s) of interest. The object of interest can be, for example, a hand of the user, an input device (e.g., stylus, controller, glove, etc.), etc. In other examples, if wireless device 300 includes more image sensors than ISPs (or any other processor or device resources) and the object is not visible to the image capturing device, the wireless device 300 can intelligently determine which image sensor to use (e.g., activate, utilize, etc.) and/or which image sensor to dedicate or share with a particular ISP (or any other processor or device resource). In some cases, this can reduce power and/or other computing resources by intelligently using a certain subset of image sensors as opposed to always using all image sensors (e.g., always leaving all image sensors on/active or powered up).

In some cases, wireless device 300 can determine (e.g., calculate) distances and angles of arrival corresponding to reflected waveforms (e.g., the distance and angle of arrival corresponding to RX waveform 318) using signal processing, machine learning algorithms, any other suitable technique, or any combination thereof. In other examples, wireless device 300 can send the RF sensing data to another computing device, such as a server (e.g., server 172), that can determine (e.g., perform the calculations to determine) the distance and angle of arrival corresponding to RX waveform 318 or other reflected waveforms.

In some examples, the distance of RX waveform 318 can be determined by measuring the difference in time from reception of the leakage signal 320 to the reception of the reflected signals. For example, wireless device 300 can determine a baseline distance of zero that is based on the difference from the time the wireless device 300 transmits TX waveform 316 to the time it receives leakage signal 320 (e.g., propagation delay). Wireless device 300 can then determine a distance associated with RX waveform 318 based on the difference from the time the wireless device 300 transmits TX waveform 316 to the time it receives RX waveform 318, which can then be adjusted according to the propagation delay associated with leakage signal 320. In doing so, wireless device 300 can determine the distance traveled by RX waveform 318 which can be used to determine the distance of an object (e.g., object 302) that caused the reflection.

In some examples, the angle of arrival of RX waveform 318 can be determined by measuring the time difference of arrival of RX waveform 318 between individual elements of a receive antenna array, such as antenna 314. In some examples, the time difference of arrival can be determined by measuring the difference in received phase at each element in the receive antenna array.

In some cases, the distance and the angle of arrival of RX waveform 318 can be used to determine the distance between wireless device 300 and object 302 as well as the position of object 302 relative to wireless device 300. The distance and the angle of arrival of RX waveform 318 can also be used to determine the size and shape of the object 302 that causes the reflection. For example, wireless device 300 can utilize the determined distance and angle of arrival corresponding to RX waveform 318 to determine the point at which TX waveform 316 reflected from object 302. Wireless device 300 can aggregate the reflection points for various reflected signals to determine the size and shape of the object 302.

For illustrative and explanation purposes, the object 302 is described throughout the disclosure as a human hand. However, one of ordinary skill in the art will recognize from this disclosure that the object 302 can include any other type of object. For example, the object 302 can include a different body part, a human, an animal, a device, a structure, or any other object or objects.

As noted above, wireless device 300 can include mobile devices such as wearable devices, such as head-mounted devices (e.g., XR devices, etc.), smartphones, laptops, tablets, etc. In some examples, wireless device 300 can be configured to obtain device location data and device orientation data together with the RF sensing data. In some instances, device location data and device orientation data can be used to determine or adjust the distance and angle of arrival of a reflected signal such as RX waveform 318. For example, a user may be holding wireless device 300 and walking through a room during the RF sensing process. In this instance, wireless device 300 can have a first location and a first orientation when it transmits TX waveform 316 and can have a second location and a second orientation when it receives RX waveform 318. Wireless device 300 can account for the change in location and the change in orientation when it processes the RF sensing data to determine the distance and angle of arrival. For example, the location data, the orientation data, and the RF sensing data can be correlated based on a timestamp associated with each element of data. In some techniques, the combination of the location data, the orientation data, and the RF sensing data can be used to determine the size and location of object 302.

In some examples, device position data can be gathered by wireless device 300 using techniques that include round trip time (RTT) measurements, passive positioning, angle of arrival, received signal strength indicator (RSSI), CSI data, using any other suitable technique, or any combination thereof. In some examples, device orientation data can be obtained from electronic sensors on the wireless device 300, such as a gyroscope, an accelerometer, a compass, a magnetometer, a barometer, any other suitable sensor, or any combination thereof. For instance, a gyroscope on wireless device 300 can be used to detect or measure changes in orientation of wireless device 300 (e.g., relative orientation) and a compass can be used to detect or measure absolute orientation of wireless device 300.

Figure 4:
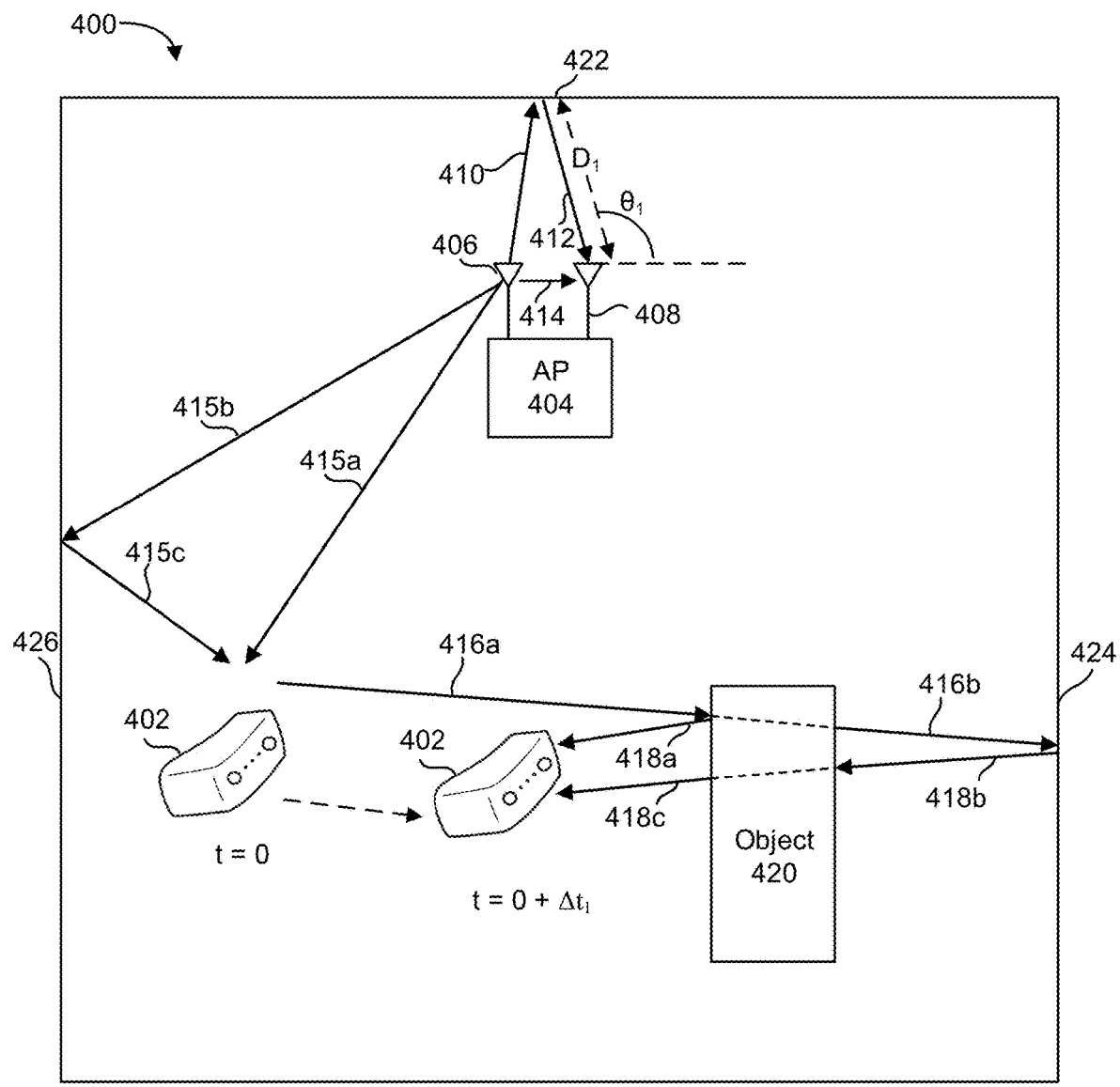
FIG. 4 is a diagram illustrating an example of an environment including wireless devices for detecting objects and/or object characteristics, in accordance with some examples of the present disclosure.

FIG. 4 is a diagram illustrating an indoor environment 400 that can include one or more wireless devices configured to perform RF sensing. In some examples, indoor environment 400 can include one or more mobile wireless devices (e.g., mobile devices 402) that can be configured to perform RF sensing to optimize XR operations/functionalities and/or resource usage as further described herein. In some cases, indoor environment 400 can include one or more stationary wireless devices (e.g., access point (AP) 404) that can be configured to perform RF sensing.

In some aspects, AP 404 can be a Wi-Fi access point having a static or fixed location within indoor environment 400. Although indoor environment 400 is illustrated as having an access point (e.g., AP 404), any type of stationary wireless device (e.g., desktop computer, wireless printer, camera, smart television, smart appliance, etc.) can be configured to perform the techniques described herein. In some examples, AP 404 can include hardware and software components that can be configured to simultaneously transmit and receive RF signals, such as the components described herein with respect to wireless device 300. For example, AP 404 can include one or more antennas that can be configured to transmit an RF signal (e.g., TX antenna 406) and one or more antennas that can be configured to receive an RF signal (e.g., RX antenna 408). As noted with respect to wireless device 300, AP 404 can include omnidirectional antennas and/or antenna arrays that are configured to transmit and receive signals from any direction.

In one aspect, AP 404 can transmit an RF signal 410 that can reflect from one or more objects (e.g., one or more objects located within a scene, walls or other barriers, devices, humans, body parts, structures, and/or other objects) located in indoor environment 400. For example, RF signal 410 can reflect from a wall 422 and cause a reflected signal 412 to be received by AP 404 via RX antenna 408. As another example, an RF signal can reflect from a hand of a user of a mobile device (e.g., mobile device 402) and can cause a reflected signal to be received by the AP 404 and/or the mobile device via a respective RX antenna. Upon transmitting RF signal 410, AP 404 can also receive a leakage signal 414 corresponding to a direct path from TX antenna 406 to RX antenna 408.

In some examples, AP 404 can obtain RF sensing data associated with reflected signal 412. For example, RF sensing data can include CSI data corresponding to reflected signal 412. In further aspects, AP 404 can use the RF sensing data to determine a distance $D_1$ and an angle of arrival $\theta_1$ corresponding to reflected signal 412. For example, AP 404 can determine distance $D_1$ by calculating a time of flight for reflected signal 412 based on the difference between leakage signal 414 and reflected signal 412. In further examples, AP 404 can determine angle of arrival $\theta_1$ by utilizing an antenna array (e.g., antenna 408) to receive the reflected signals and measuring the difference in received phase at each element of the antenna array.

In some examples, AP 404 can utilize the distance $D_1$ and an angle of arrival $\theta_1$ corresponding to reflected signal 412 to identify wall 422. In some aspects, AP 404 can identify a position, shape, and/or size of the wall 422 based on the distance $D_1$ and an angle of arrival $\theta_1$ corresponding to reflected signal 412. In some aspects, AP 404 can communicate with a server (e.g., server 172) to provide data regarding the position, shape, and/or size of the wall 422. In some examples, AP 404 can gather RF sensing data and provide the RF sensing data to a server for processing the calculations of time of flight and angle of arrival for the reflected signals.

In some examples, indoor environment 400 can include mobile device 402. Although illustrated as a head-mounted XR device, mobile device 402 can include any type of mobile device such as a smartphone, tablet, laptop, smartwatch, etc. According to some examples, mobile device 402 can be configured to perform RF sensing in order to identify the position, shape, and/or size of one or more objects in indoor environment 400.

In some cases, mobile device 402 can cause an RF waveform 416a to be transmitted via one of its RF transmitters, such as RF transmitter 306. As illustrated, RF waveform 416a is transmitted at a time t=0. In some instances, mobile device 402 can be moving while performing RF sensing such that it is in a different location at a later time, which in this example is illustrated as t=0+$\Delta t_1$.

In some examples, RF waveform 416a can reflect from object 420 and cause reflected waveform 418a to be received by mobile device 402 at time t=0+$\Delta t_1$. In some cases, the wavelength of RF waveform 416a can be configured to permit it to penetrate and/or traverse object 420 (shown as RF waveform 416b after penetrating through the object 420) and reflect from wall 424. The reflection 418b from wall 424 can traverse object 420 and result in a second reflected waveform 418c being received by mobile device 402 at a later time, e.g., t=0+$\Delta t_2$.

In some examples, mobile device 402 can gather RF sensing data corresponding to reflected waveforms 418a and 418c. Mobile device 402 can also capture device location data and device orientation data that corresponds to the time (e.g., t=0) at which RF waveform 416a was transmitted and also to the times at which reflected waveforms 418a (e.g., t=0+$\Delta t_1$) and 418c (e.g., t=0+$\Delta t_2$) were received.

In some aspects, mobile device 402 can utilize the RF sensing data to determine time of flight and angle of arrival for each reflected waveform 418a and 418c. In some examples, mobile device 402 can utilize the location data and orientation data to account for the device's movement during the RF sensing process. For example, the time of flight of reflected waveforms 418a and 418c can be adjusted based on the device's movement towards object 420 and/or wall 424, respectively. In another example, the angle of arrival of reflected waveforms 418a and 418c can be adjusted based on the movement and orientation of mobile device at the time it transmitted RF waveform 416*a* versus the time mobile device 402 received reflected waveforms 418*a* and 418*c*.

Figure 5A:
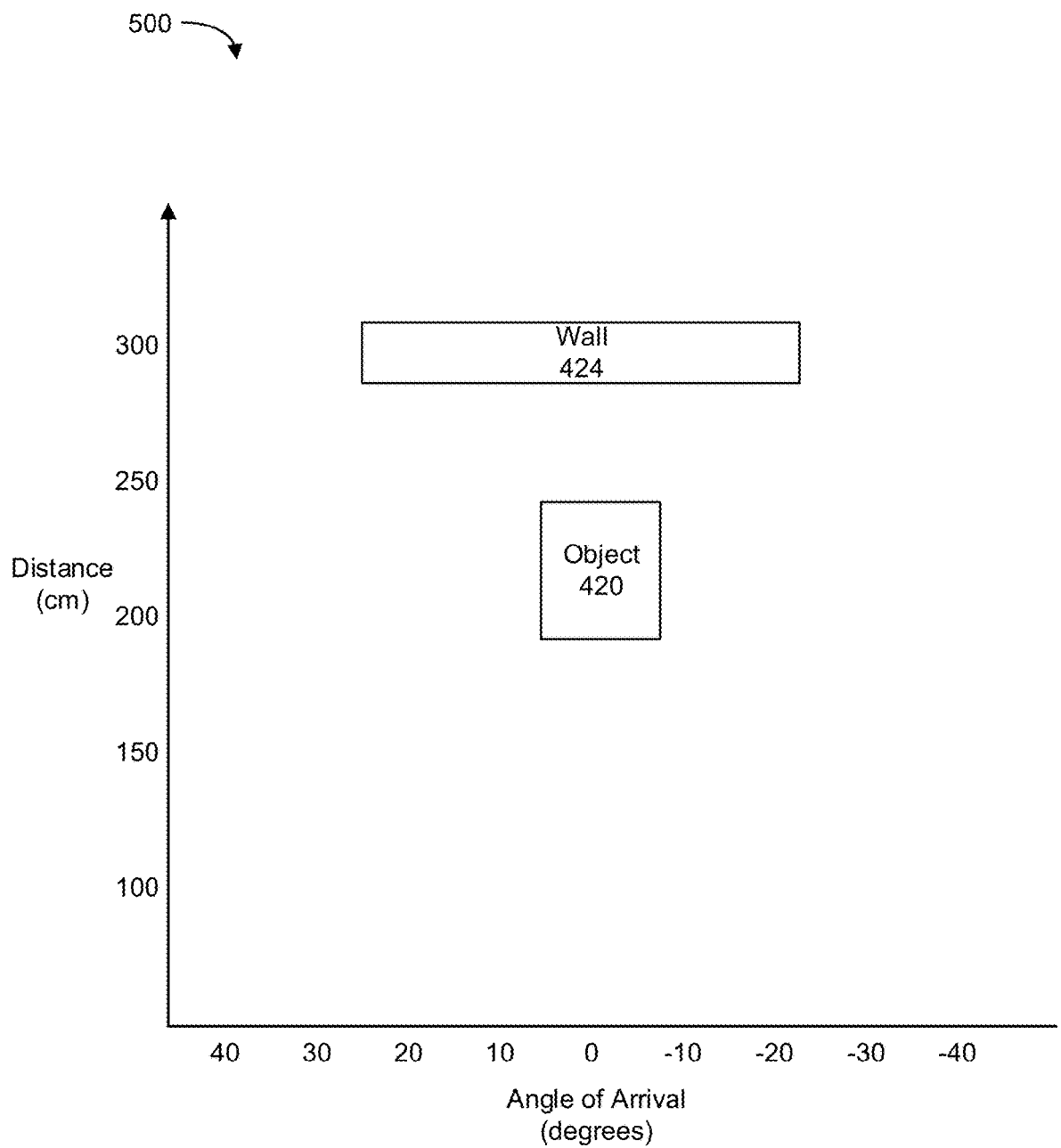
FIG. 5A is an example of a graphical representation that depicts the size and position of an object and a wall based on radio frequency sensing, in accordance with some examples of the present disclosure.

In some cases, mobile device 402 can utilize the time of flight, angle of arrival, location data, and/or orientation data to determine a size, shape, and/or position of object 420 and/or wall 424. FIG. 5A is an example of a graphical representation 500 that depicts the width and distance of an object 420 and a wall 424 based on RF sensing that can be performed by mobile device 402.

As illustrated, the graphical representation 500 can include azimuth in degrees on the x-axis and distance in centimeters on the y-axis. The graphical representation 500 can further include references to object 420 and wall 424 that are based on the azimuth and time of flight of reflected signals. The graphical representation 500 illustrates that RF sensing techniques can be used to detect reflections from objects or walls that are behind one another. In this example, RF waveform 416*a* produced a first reflection from object 420 and a second reflection from wall 424, which were received by mobile device 402.

Mobile device 402 can utilize the distance and azimuth data to identify the distance and width object 420 and wall 424. In some techniques, mobile device 402 can use distance, azimuth, and elevation data to create a map of an indoor environment 400 that includes references to object 420 and wall 424. In other techniques, mobile device 402 can use the RF sensing data to modify a partial map that it receives from a server, such as server 172. In other aspects, mobile device 402 can send the RF sensing data to a server for processing and creation of an indoor map of indoor environment 400.

In some examples, AP 404 and mobile device 402 can be configured to implement a bistatic configuration in which the transmit and receive functions are performed by different devices. For example, AP 404 (and/or other device within the indoor environment 400 that is static or stationary) can transmit an omnidirectional RF signal that can include signal 415*a* and 415*b*. As illustrated, signal 415*a* can travel directly (e.g., no reflections) from AP 404 to mobile device 402. Signal 415*b* can reflect off of a wall 426 and cause a corresponding reflected signal 415*c* to be received by mobile device 402.

In some cases, mobile device 402 can utilize RF sensing data associated with the direct signal path (e.g., signal 415*a*) and the reflected signal path (e.g., signal 415*c*) to identify the size and shape of reflectors (e.g., wall 426). For instance, mobile device 402 can obtain, retrieve, and/or estimate location data associated with AP 404. In some aspects, mobile device 402 can use location data associated with AP 404 and RF sensing data (e.g., CSI data) to determine time of flight, distance, and/or angle of arrival associated with signals transmitted by AP 404 (e.g., direct path signals such as signal 415*a* and reflected path signals such as signal 415*c*). In some cases, mobile device 402 and AP 404 can further send and/or receive communication that can include data associated with RF signal 415*a* and/or reflected signal 415*c* (e.g., transmission time, sequence/pattern, time of arrival, time of flight (TOF), angle of arrival, etc.).

In some examples, mobile device 402 and/or AP 404 can obtain RF sensing data in the form of CSI data that can be used to formulate a matrix that is based on the number of frequencies represented as 'K' (e.g., tones) and the number of antenna array elements represented as 'N'.

Upon formulating the CSI matrix, mobile device 402 and/or AP 404 can calculate the distance, azimuth, and/or elevation for direct signal paths as well as reflected signal paths by utilizing a Two-Dimensional Fourier transform.

In some examples, mobile device 402 and AP 404 can perform RF sensing techniques irrespective of their association with each other or with a Wi-Fi network. For example, mobile device 402 can utilize its Wi-Fi transmitter and Wi-Fi receiver to perform RF sensing as discussed herein when it is not associated with any access point or Wi-Fi network. In further examples, AP 404 can perform RF sensing techniques regardless of whether it has any wireless devices associated with it.

Figure 5B:
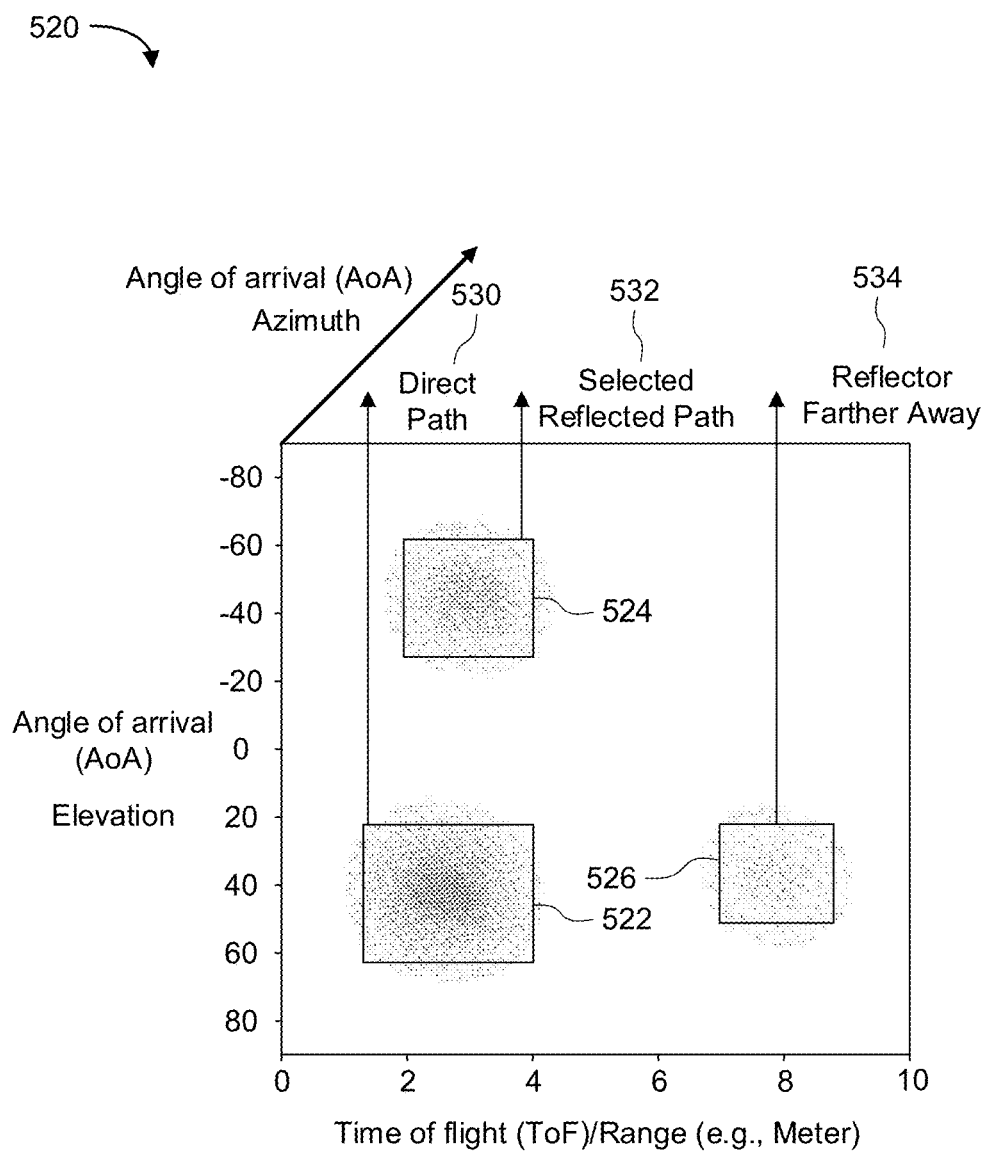
FIG. 5B is another example of a graphical representation that depicts the size and position of objects determined by radio frequency sensing, in accordance with some examples of the present disclosure.

FIG. 5B is another example of a graphical representation 520 that depicts the size (e.g., width, height, etc.) and position of objects 522, 524, and 526 determined by RF sensing as described herein. In some examples, the size and position of the objects 522, 524, and 526 can be determined by the mobile device 402 using RF sensing. In other examples, the size and position of the objects 522, 524, and 526 can be determined by another device using RF sensing, such as server 172 or any other device that includes at least one RF interface.

As illustrated, the graphical representation 520 can include angle of arrivals (AoAs) and elevations on the x-axis (and y-axis) and TOF/ranges on the z-axis. The graphical representation 520 can include references to objects 522, 524, and 526 that are based on the azimuth, elevation, and TOF/ranges of signals. The graphical representation 520 illustrates that RF sensing techniques can be used to detect reflections from objects in order to determine the size, shape, and/or position of such objects. In this example, the objects have different sizes and different positions relative to the mobile device 402.

The size, shape, and/or position of object 522 can be represented based on the azimuth, elevation and TOF/range calculated for direct path 530 of a transmitted or leaked signal. In some examples of a bistatic configuration, the object 522 can represent the mobile device 402 and/or one or more components of the mobile device 402. Similarly, the size, shape, and/or position of object 524 can be determined based on the azimuth, elevation, and TOF/range calculated for selected reflected path 532 associated with one or more reflected signals. The selected reflected path 532 can include one or more reflected signal paths selected based on a distance of the one or more reflected signal paths relative to the direct path 530. For example, the selected path 532 can include a reflected path having a distance that is within a threshold above a distance associated with the direct path 530.

In some cases, the distance and/or threshold distance used to select the selected path 532 can depend on the object of interest. For example, if the object of interest is a hand of a user wearing an XR device (e.g., mobile device 402), the distance of the selected path 532 can be shorter than the distance of one or more other reflected paths corresponding to one or more signals reflected from one or more other objects that are not affixed to the user (e.g., a wall, a structure, etc.), as the hand of the user can be expected to be within a certain distance of the user (and thus the XR device worn by the user), such as 1.5 m or 1 m, while the one or more other objects may be anywhere within a greater range of distances relative to the user (and thus the XR device worn by the user) including distances that exceed the typical distance between a user's hand and the user (and/or an XR device worn by the user, a device held by the user, etc.), such as 1.5 m or 1 m.

Moreover, the size, shape, and/or position of object 526 can be determined based on the azimuth, elevation, and TOF/range calculated for reflected path 534 associated with one or more signals reflected from the object 526. In this example, the object 526 is at a greater relative distance than the object 522 and the object 524. The greater relative distance in this example exceeds the threshold(s) determined for selecting the selected reflected path 532. In some examples, the threshold(s) may be expressed with regard to a difference between the TOF for the direct path and the TOF for the respective reflected path.

In some examples, to detect the size, shape, and/or position of the object 524, the mobile device 402 (or another device) can select one or more reflected paths (e.g., paths of reflected signals) that are within a threshold distance relative to the direct path 530 and estimate the azimuth and elevation of each selected reflected path to measure the dimension of the object 524. For example, in an illustrative example, if the object of interest is a hand and the threshold distance is a meter, the mobile device 402 can select one or more reflected paths that are less than or equal to a meter in distance relative to the direct path 530.

In some cases, an object classification algorithm (e.g., signal processing, machine learning, or the like) can be implemented to classify the object 524. For example, if the object of interest is a hand, an object classification algorithm can be implemented to classify the object 524 as the hand or not the hand.

In some examples, the RF Sensing techniques can implement signal processing to extract reflections and focus on reflections that are shorter in distance (e.g., within a distance threshold) to detect objects close to the mobile device 402, such as a user's hands, a controller, etc., to reduce a computational complexity, and/or to reduce a power consumption at the mobile device 402. In some cases, the RF sensing can be used to estimate the location and/or dimension of an object that causes the reflections. In some examples, an object classification algorithm (e.g., signal processing, machine learning, etc.) can be used to perform binary classification of the object to indicate whether the object is a particular type of object or not. For example, the object classification algorithm can perform binary classification to indicate whether the object is a hand or not.

The RF sensing can track at 360 degrees and is not limited by a camera view. In some examples, the RF sensing can track an object outside of a camera view. For example, the RF sensing can track a user's hands when the hands are outside of a camera view or occluded from the camera view. In some cases, the RF sensing can provide an estimation of an object's location. An electronic device, such as mobile device 402, can use the estimation to predict a future position of the object and/or achieve smooth object tracking. In some cases, an electronic device, such as mobile device 402, can provide the estimation to another device such as a server or another electronic device to help predict a future position of the object and/or achieve smooth object tracking. In some examples, the electronic device can signal the position of the object (e.g., calculated using RF sensing) to a destination device (e.g., a server or any other device) regardless of the object being outside of the camera view (or occluded from the camera view) or not. For example, as previously explained, the electronic device can calculate the position of a user's hand(s) using RF sensing even if the user's hand(s) is/are outside of the FOV of the camera device(s) on the electronic device. The electronic device can signal the calculated position of the user's hand(s) to a destination device, such as a server or mobile phone, regardless of whether the user's hand(s) is/are in the FOV of the camera device(s) or not.

In some examples, the size, shape, and/or position of an object can be determined using RF sensing in order to determine whether such object is visible to an image capturing device of a mobile device (e.g., mobile device 402). For example, the size, shape and/or position of an object can be determined using RF sensing to determine whether the object is within a FOV of the image capturing device and/or whether the object is occluded (e.g., whether the image capturing device's view of the object is obstructed). In some cases, if the position of an object of interest does not correspond to a FOV of the image capturing device (e.g., the object is not within the FOV of the image capturing device) or if the object's position does correspond to the FOV of the image capturing device but the object is otherwise occluded/obstructed from the image capturing device's view/visibility, the mobile device associated with the image capturing device can turn off the image capturing device or set a power setting of the image capturing device to a lower power mode. In some examples, if the mobile device turns off the image capturing device, the mobile device can use RF sensing to monitor the movement of the hand and turn on the image capturing device ahead of time when the hand is nearing the FOV of the image capturing device (e.g., approaching the FOV within a threshold timeframe, distance, etc.) so the image capturing device can capture an image(s) of the hand when the hand is in the FOV of the image capturing device. The mobile device can use the image(s) to determine a hand gesture once the hand is within the FOV of the image capturing device.

Since the image capturing device is unable to capture an image of the object of interest while the object is occluded or outside of the FOV of the image capturing device, the mobile device can turn off or power down the image capturing device to conserve power. If the object of interest subsequently comes within the FOV of the image capturing device or if the object is no longer occluded/obstructed, the mobile device can turn the image capturing device on or set the power setting of the image capturing device to a higher power mode to allow the image capturing device to capture an image(s) and/or higher quality image(s) of the object, as the object is now visible to the image capturing device thus allowing the image capturing device to capture an image of the object.

In some examples, in order to reduce power consumption and/or optimize resource use at the mobile device, when the object of interest is not within the FOV of one or more image sensors at the mobile device or is occluded such that the one or more image sensors are unable to capture an image of the object, the mobile device can control which image sensors at the mobile device are used by which processors at the mobile device. For example, in some cases, the mobile device can include multiple image sensors and multiple ISPs for processing image data from the image sensors. In some cases, if the number of image sensors exceeds the number of ISPs, multiple image sensors can share a same ISP that processes image data from such image sensors.

However, if the object of interest is within the FOV of an image sensor and not otherwise occluded from the image sensor's view, the mobile device can dedicate an ISP to that image sensor for processing image data from that image sensor. If the object of interest is otherwise occluded or outside of the FOV of a number of image sensors, the mobile device can instead allow those image sensors to share a same ISP. In some cases, the mobile device can allocate image sensors to ISPs (or vice versa) intelligently to increase or decrease image processing capabilities for certain image sensors (or for image data from certain image sensors)

depending on whether an object of interest is within a FOV of one or more image sensors or occluded from a view of the one or more image sensors. The mobile device can determine whether the object is within the FOV, outside of the FOV, occluded and thus not visible to an image sensor(s), etc., using RF sensing as described herein.

In other examples, the size, shape, and/or position of an object can be determined using RF sensing in order to reduce the size of uplink frames sent to a particular device, such as a server, for tracking operations. For example, in some cases, the mobile device 402 can capture images of an object(s) in a scene and send the captured images to a destination device that uses such images to track the object(s) in the scene. To reduce bandwidth usage, latency, etc., the mobile device 402 can reduce the size of the images sent to the destination device by cropping the images to include the object(s) in the image and exclude other portions of the image. The mobile device 402 can use RF sensing to detect the object(s) and determine the position of the object(s). The mobile device 402 can use the determined position of the object(s) to determine how/where to crop the images capturing the object(s). The cropped images can be smaller and thus allow the mobile device 402 to reduce the size of uplink traffic including the cropped images sent to the destination device.

Figure 6:
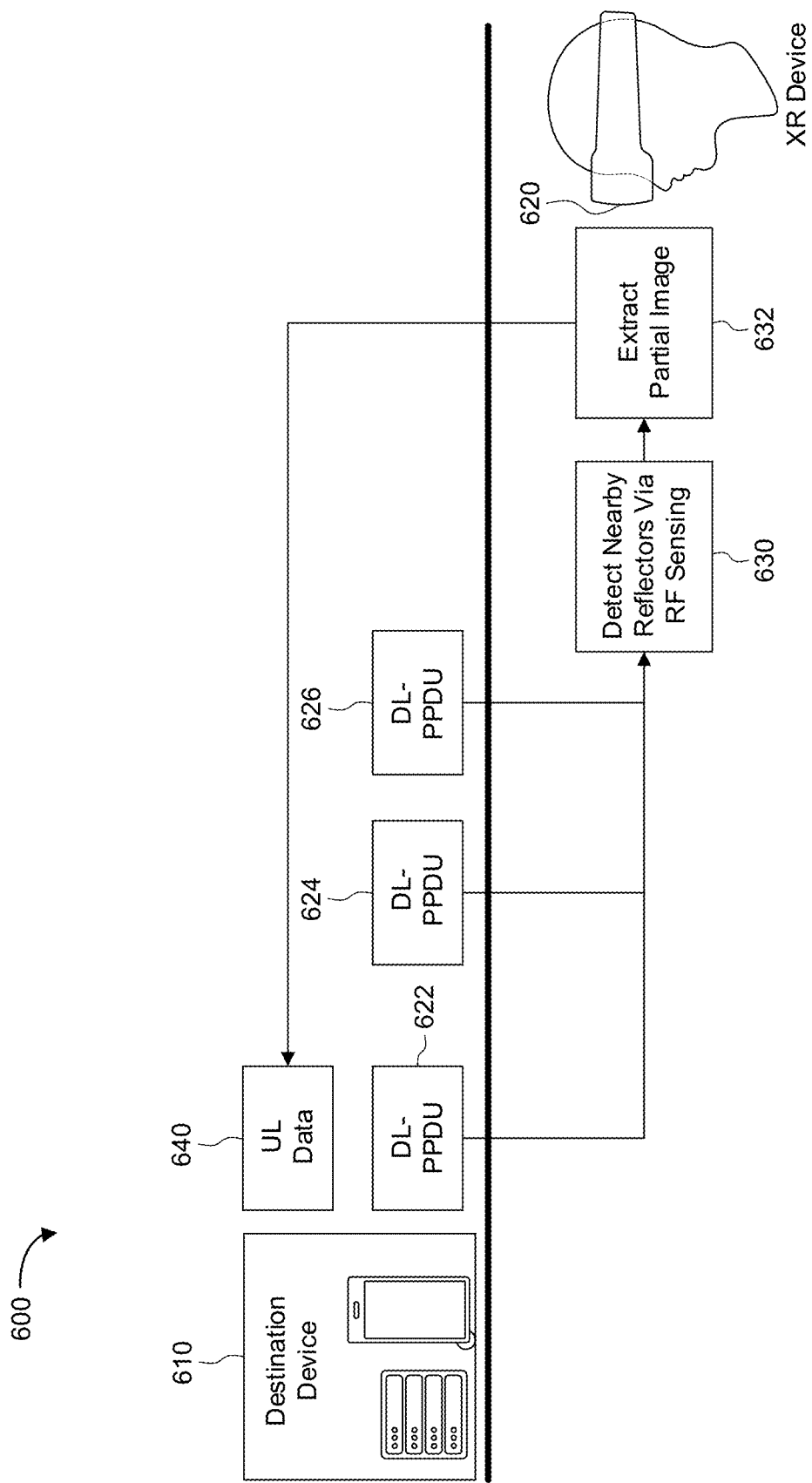
FIG. 6 is a diagram illustrating an example use case for using radio frequency sensing to reduce uplink traffic from an extended reality device to a destination device, in accordance with some examples of the present disclosure.

For example, FIG. 6 illustrates an example use case 600 for using RF sensing to reduce uplink traffic from an XR device 620 to a destination device 610. The uplink traffic can include tracking frames captured by an image capturing device including one or more image sensors on the XR device 620, which the destination device 610 can use to track one or more objects (e.g., a hand, a device, etc.) in a scene. In some cases, the destination device 610 can additionally or instead use the tracking frames for other operations such as, for example, mapping a scene and/or features in a scene. In some cases, the destination device 610 can be a server such as, for example, an edge server on a cloud network. In other cases, the destination device 610 can be a user electronic device such as, for example, a smartphone, a tablet, a laptop, a game console, etc.

As shown, the destination device 610 can send downlink (DL) frames 622, 624, and 626 to the XR device 620 according to a wireless communication protocol standard as described above. The XR device 620 can use the DL frames 622 through 626 to detect nearby reflectors (e.g., objects causing reflections of signals transmitted by the destination device 610) using RF sensing. The XR device 620 can use RF sensing to detect a location, shape, and/or size of the nearby reflectors. In some examples, the XR device 620 can use CSI captured in the DL frames 622 through 626 to extract/identify reflection information, such as azimuth, elevation, and/or distance of reflection paths/signals.

At block 630, the XR device 620 can estimate the location of the nearby reflectors (and optionally the size and/or shape of the nearby reflectors) based on the reflection information. For example, the XR device 620 can determine the azimuth, elevation and TOF/range of the reflected paths associated with the nearby reflectors to calculate the three-dimensional (3D) position of the nearby reflectors in physical space.

At block 632, the XR device 620 can use the determined location of a reflector of interest to extract a partial image capturing the reflector of interest. For example, the XR device 620 can capturing (e.g., via an image capturing device of the XR device 620) an image of the reflector of interest. The XR device 620 can use the determined location of the reflector to determine how to crop the image to generate a smaller/partial image that includes the reflector but excludes other portions of the captured image. The XR device 620 can then crop the image to generate the smaller/partial image that includes the reflector.

The XR device 620 can send the smaller/partial image including the reflector to the destination device 610 in a UL frame 640. Since the image containing the reflector has been cropped/reduced, the UL frame 640 can be smaller than it would be if the XR device 620 instead sent the captured image without first cropping the image as previously described. As a result, the XR device 620 can reduce the size of UL traffic to the destination device 610, the latency of UL traffic, etc.

In some implementations, if the XR device 620 supports multi-link operation (MLO), the XR device 620 can use a Wi-Fi radar to capture the CSI and perform RF sensing. For example, the XR device 620 can send Wi-Fi sounding signals to the destination device 610 using one link while maintaining DL/UL traffic in another link in order to avoid causing extra ON time for the XR device 620. In other cases, if the XR device 620 does not support MLO, the XR device 620 can slightly increase a Wi-Fi ON time to cover a Wi-Fi radar airtime. For example, the XR device 620 can increase the Wi-Fi ON time at the beginning or end of the device data TX/RX window.

In some cases, the XR device 620 can perform RF sensing with a single received frame, and can learn the surrounding environment using that single received frame. In other cases, the XR device 620 can optionally use multiple received frames for RF sensing to improve the detection accuracy (e.g., using the existing DL data frames available).

Figure 7A:
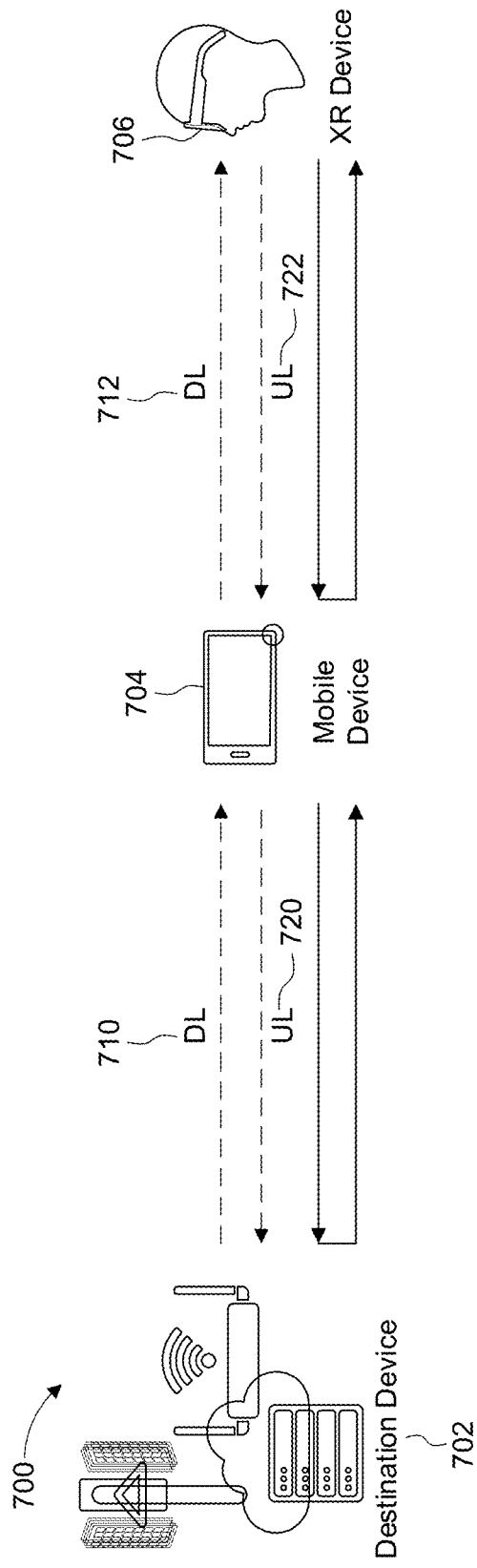
FIGS. 7A and 7B are diagrams illustrating example extended reality rendering scenarios, in accordance with some examples of the present disclosure.
Figure 7B:
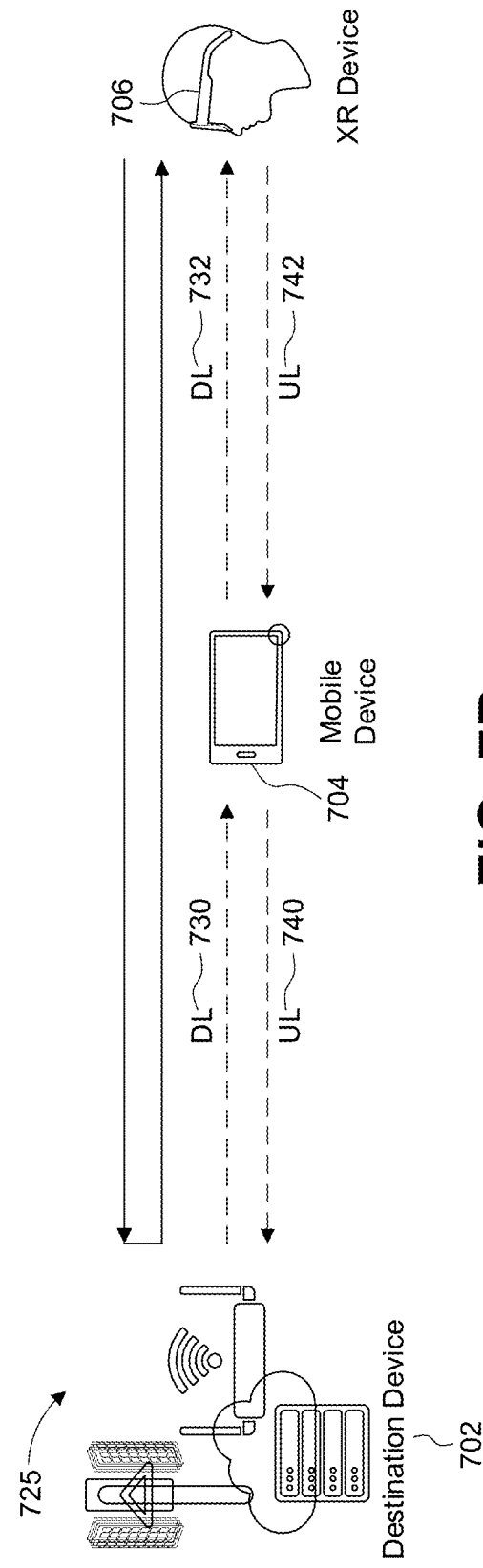

FIGS. 7A and 7B are diagrams illustrating example rendering scenarios for XR involving communications between a destination device 702, a mobile device 704, and an XR device 706. FIG. 7A illustrates a rendering scenario 700 for XR where virtual content associated with an XR application is rendered by the mobile device 704.

In this example, the destination device 702 can send DL data 710 to the mobile device 704, and can receive UL data 720 from the mobile device 704. In some cases, the link between the destination device 702 and the mobile device 704 can be decoupled from the link between the mobile device 704 and the XR device 706. The DL data 710 can include, for example and without limitation, virtual content associated with an XR experience/application, tracking information, mapping information, and/or any other XR data. The UL data 720 can include, for example and without limitation, tracking frames, location information, data requests, etc.

In some cases, the destination device 702 can be a server such as, for example, an edge server on a cloud network. In other cases, the destination device 702 can be any electronic device such as, for example, a laptop, a desktop computer, a tablet, a game console, etc. The mobile device 704 can include any electronic device such as, for example, a smartphone, a tablet, a laptop, an IoT device, a game console, etc. The XR device 706 can include an XR (e.g., AR, VR, etc.) wearable device such as, for example, an HMD, smart glasses, etc.

The mobile device 704 can receive the DL data 710 and send DL data 712 to the XR device 706, which the XR device 706 can use for an XR presentation/experience. In some examples, the DL data 712 can include rendered virtual content. For example, the mobile device 704 can render virtual content from the destination device 702 and send the rendered virtual content to the XR device 706. In some cases, the DL data 712 can include XR-related data such as, for example, a depth map, eye buffer (e.g., render texture, eye buffer resolution, etc.), tracking information, and/or any other XR data.

The XR device 706 can obtain sensor data, such as inertial measurements, image data, etc., and provide such data to the mobile device 704. For example, the XR device 706 can send to the mobile device 704 UL data 722 including data from one or more inertial measurement units (IMUs) and a tracking frame from an image capturing device at the XR device 706. In some cases, the mobile device 704 can use the UL data 722 to render virtual content according to a position of the XR device 706 and/or one or more objects in a scene.

FIG. 7B illustrates another example rendering scenario 725 where virtual content is rendered at the destination device 702. In this example, the destination device 702 can send DL data 730 to the mobile device 704 and receive UL data 740 from the mobile device 704. The mobile device 704 can send DL data 732 to the XR device 706 and receive UL data 742 from the XR device 706. In this example, the mobile device 704 can be used as a pass-through with minimum or lower processing for XR data between the destination device 702 and the XR device 706.

In some cases, the UL data 722 and the UL data 742 from the XR device 706 can include a partial frame generated as previously described with respect to FIG. 6. For example, the UL data 722 and the UL data 742 can include a tracking frame generated by cropping an image of an object of interest. The image can be cropped based on a location of the object of interest estimated using RF sensing. For example, the XR device 706 can capture an image of an object, use RF sensing to estimate the location of the object, and use the location of the object to crop the image of the object to reduce its size while still capturing the object of interest. The XR device 706 can provide the cropped image in the UL data 722 or the UL data 742. The destination device 702 can use the cropped image to help track the object and/or predict a future position of the object.

Figure 8:
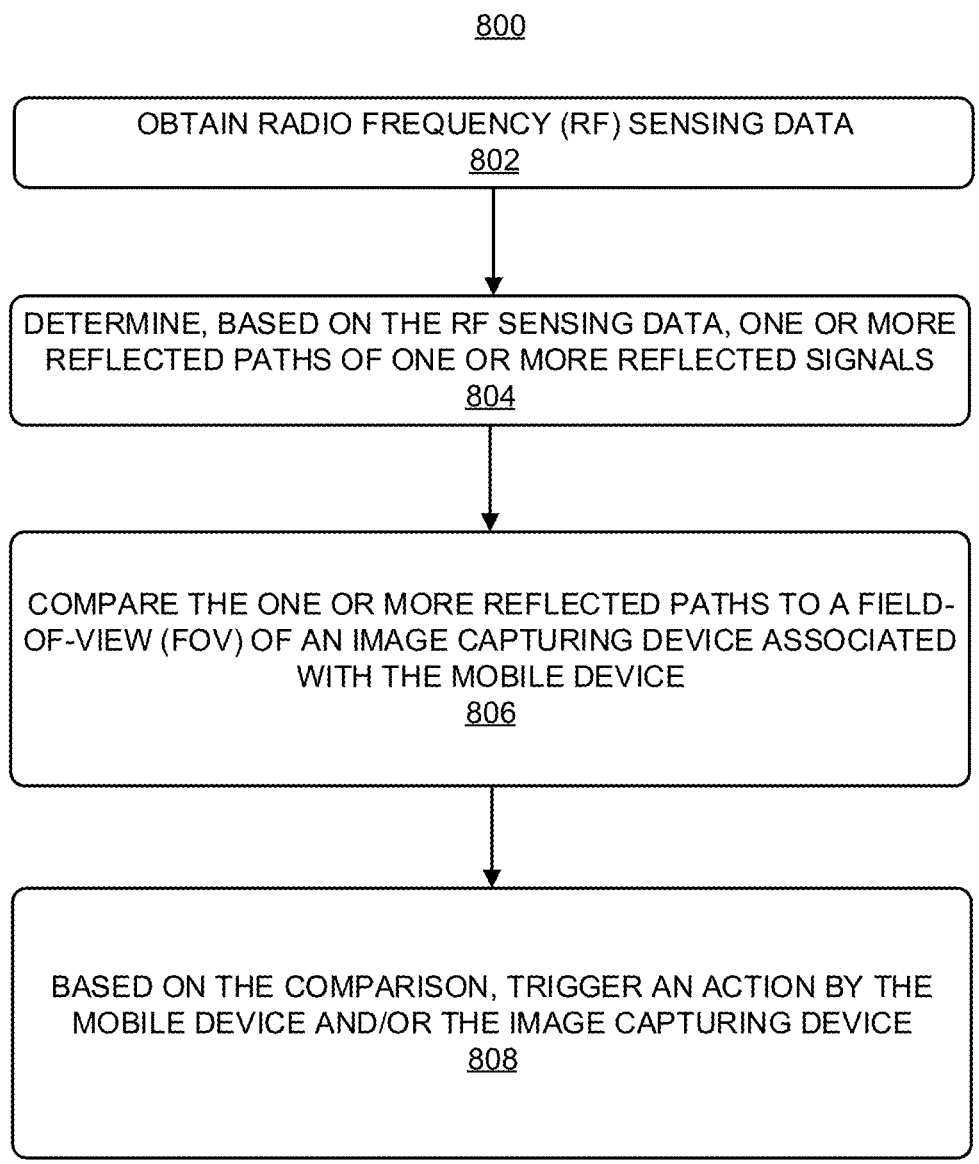
FIG. 8 is a flow diagram illustrating an example process for extended reality optimizations using radio frequency sensing, in accordance with some examples of the present disclosure.

FIG. 8 is a flowchart illustrating an example process 800 for performing XR optimization using RF sensing. At block 802, the process 800 can include obtaining RF sensing data. In some examples, the sensing data can include channel state information (CSI). In some cases, the RF sensing data can include a set of data associated with a received waveform that is a reflection of a transmitted waveform reflected from an object. In some examples, the transmitted waveform can include a signal (e.g., a Wi-Fi signal) that is transmitted by an antenna from a wireless device such as an XR device (e.g., XR device 620, XR device 706).

In some cases, the RF sensing data can include CSI data corresponding to reflections received in response to transmission of a signal. In one illustrative example, the RF sensing data can include Wi-Fi CSI data corresponding to reflections received in response to transmission of a Wi-Fi signal. In other examples, the RF sensing data can include CSI data obtained using 5G NR, Bluetooth™, UWB, 60 GHz mmWave, any combination thereof, or other type of signal(s).

In some examples, the RF sensing data can include data associated with a received leakage waveform that corresponds to a transmitted waveform and/or associated with one or more reflected waveforms that correspond to the one or more reflected RF signals.

At block 804, the process 800 can include determining, based on the RF sensing data, one or more reflected paths of one or more reflected RF signals. In some examples, each reflected RF signal can include a reflection of a transmitted RF signal from one or more objects in a physical space. In some cases, at least one of the one or more objects can include a hand associated with a user of a mobile device such as an XR device, a smartphone, etc.

In some examples, determining one or more reflected paths of one or more reflected RF signals can include determining paths of RF signals including a direct path of a transmitted RF signal and determining a location of the one or more objects relative to the mobile device based on the paths of the RF signals.

At block 806, the process 800 can include comparing the one or more reflected paths to a FOV of an image capturing device associated with the mobile device. In some cases, comparing the one or more reflected paths to the FOV of the image capturing device can include determining, based on the one or more reflected paths, whether the one or more objects are within a portion of a scene corresponding to the FOV of the image capturing device associated with the mobile device. In some aspects, the process 800 can include determining a location of the one or more objects relative to the mobile device. In some cases, the location of the one or more objects can be determined based on determined paths of RF signals including a direct path of a transmitted RF signal and/or the one or more reflected paths of the one or more reflected RF signals.

In some examples, determining the location of the one or more objects can include determining a respective distance, a respective reflection angle, and/or a respective elevation associated with the one or more reflected paths. In some cases, the location of the one or more objects can be determined based on the respective distance, the respective reflection angle, and/or the respective elevation.

In some cases, determining the location of the one or more objects can include determining a respective distance, azimuth, and/or elevation of paths between the mobile device and each of the one or more objects. In some cases, the location of the one or more objects can be determined based on the respective distance, azimuth, and/or elevation.

At block 808, the process 800 can include triggering, based on the comparison, an action by the mobile device and/or an image capturing device associated with the mobile device. In some cases, triggering the action can be based on a determination whether the one or more objects are within a portion of a scene corresponding to the FOV of the image capturing device. In some examples, the determination whether the one or more objects are within the portion of the scene corresponding to the FOV of the image capturing device can be based on the comparison.

In some examples, the triggered action can include controlling a power setting of the image capturing device. In some cases, controlling the power setting of the image capturing device can be further based on a light level being below a threshold and/or a privacy setting. In some examples, the privacy setting can be based on a user input, application data, and/or global navigation satellite system (GNSS) data.

In some examples, the triggered action can include extracting a portion of an image that contains the one or more objects. In some cases, the triggered action can include determining whether to capture one or more images of the one or more objects. In some examples, the triggered action can be further based on a determination that the one or more objects are within a portion of a scene corresponding to the FOV of the image capturing device. In some examples, the determination that the one or more objects are within the portion of the scene corresponding to the FOV of the image capturing device can be based on the comparison.

In some cases, determining whether the one or more objects are within a portion of a scene corresponding to the FOV of the image capturing device can be based on a respective distance, a respective azimuth, and/or a respective elevation associated with the one or more reflected paths and/or the one or more reflected RF signals.

In some examples, determining whether the hand is within a portion of a scene corresponding to the FOV of the image capturing device can include determining, based on the comparison, that the one or more objects are outside of the FOV of the image capturing device. In some cases, the process 800 can include, based on a determination that the one or more objects are outside of the FOV of the image capturing device, setting a power setting of the image capturing device to an adjusted power state that is lower than a different power state associated with the image capturing device when the one or more objects are within a portion of a scene corresponding to the FOV of the image capturing device. In some cases, the adjusted power state can be an off state. In other cases, the adjusted power state can be an on state associated with a lower power mode than a power mode of the image capturing device when the one or more objects are within the portion of the scene corresponding to the FOV of the image capturing device.

In some examples, the process 800 can include determining, based on the comparison, whether the one or more objects are within a portion of a scene corresponding to the FOV of the image capturing device. In some cases, determining whether the one or more objects are within the portion of the scene corresponding to the FOV of the image capturing device can include determining that a view of the image capturing device to the one or more objects is obstructed by at least one object (e.g., occluded from a view of the image capturing device).

In some aspects, the process 800 can include determining that the one or more objects are moving towards a portion of a scene corresponding to the FOV of the image capturing device; and based on determining that the one or more objects are moving towards the portion of the scene corresponding to the FOV of the image capturing device, adjusting the power setting of the image capturing device to the different power state.

In some aspects, the process 800 can include determining, based on one or more reflected paths, a size and/or shape of the one or more objects.

In some aspects, the process 800 can include determining that a view of the image capturing device to the one or more objects is obstructed by at least one object. In some cases, determining that a view of the image capturing device to the one or more objects is obstructed by at least one object includes determining that the one or more objects are within a portion of a scene corresponding to the FOV of the image capturing device, and determining, based on a location of the one or more objects, that the view of the image capturing device to the one or more objects is obstructed by at least one object.

In some cases, the image capturing device can include a plurality of image sensors. In some examples, the triggered action can include controlling a power setting of the image capturing device. In some cases, controlling the power setting of the image capturing device can include controlling individual power settings of the plurality of image sensors. In some cases, controlling individual power settings of the plurality of image sensors can include dedicating, based on determining that the hand is within an FOV of a particular one of the plurality of image sensors, at least one of a plurality of processors of the apparatus to the particular one of the plurality of image sensors for image processing.

In some aspects, the process 800 can include determining, based on the comparison, that the one or more objects are within a portion of a scene corresponding to the FOV of the image capturing device; and determining, based on a location of the one or more objects, that a view of the image capturing device to the hand is obstructed by the at least one object. In some aspects, the process 800 can include controlling, based on determining that the hand is outside of the FOV of the image capturing device, a use of a plurality of image capturing devices of the mobile device by a plurality of processors (e.g., ISPs, etc.) of the mobile device. In some cases, controlling the use of the plurality of image capturing devices by the plurality of processors can include dedicating, to one of the plurality of processors, a particular one of the plurality of image capturing devices that was previously shared by two or more of the plurality of processors.

In some aspects, the process 800 can include controlling, based on determining that the one or more objects are outside of the FOV of the image capturing device, a use of a plurality of image capturing devices of the mobile device by a plurality of processors of the mobile device. In some examples, the plurality of image capturing devices can include the image capturing device. In some cases, controlling the use of the plurality of image capturing devices by the plurality of processors can include dedicating, to one of the plurality of processors, a particular one of the plurality of image capturing devices that was previously shared by two or more of the plurality of processors. In some examples, each of the plurality of processors can include an image signal processor, and each of the plurality of image capturing devices can include an image sensor.

In some aspects, the process 800 can include determining that the one or more objects are outside of the FOV of the image capturing device and moving towards a portion of a scene corresponding to the FOV of the image capturing device; and in response to determining that the one or more objects are outside of the FOV of the image capturing device and moving towards the portion of the scene corresponding to the FOV of the image capturing device, switching an active camera setting from the image capturing device to a different image capturing device, the switched active camera setting triggering the apparatus to use the different image capturing device to capture one or more images.

In some aspects, the process 800 can include determining, based on the one or more reflected paths, a shape of an object from the one or more objects; determining, based on the shape of the object, that the object is the hand associated with the user. In some aspects, the process 800 can include generating, using an image captured by the image capturing device, a cropped image of the hand and sending the cropped image to a destination device (e.g., destination device 702, mobile device 704). In some cases, the process 800 can include sending, to the destination device, the cropped image and a request for a tracked pose of the hand within a map of the physical space and/or a gesture of the hand. In some examples, the cropped image can be generated based on the location of the one or more objects. In some examples, the location of the one or more objects includes a hand location. In some cases, the destination device can include a server (e.g., server 172) and/or a mobile device (e.g., UE 104, user device 210, wireless device 300, mobile device 402, mobile device 704).

In some aspects, the process 800 can include determining a location of the one or more objects relative to the mobile device based on the one or more reflected paths. In some cases, the cropped image is generated based on the location of the one or more objects. In some examples, the location of the one or more objects can include a hand location. In some aspects, the process 800 can include selecting at least one of the one or more reflected paths based on a respective distance of an associated object being within a distance threshold.

In some examples, the mobile device can be an XR device (e.g., XR device 620, XR device 706). In some cases, the mobile device can include a head-mounted display.

In some aspects, the process 800 can include detecting, using a machine learning algorithm, a hand associated with a user of the mobile device and/or an obstruction of a view of the image capturing device to the hand. In some cases, the hand can include at least one of the one or more objects.

In some aspects, the process 800 can include determining, based on the one or more reflected paths, a map of the physical space and/or a hand gesture associated with the hand of the user.

In some examples, the processes described herein (e.g., process 800 and/or other process described herein) may be performed by a computing device or apparatus (e.g., a UE, an XR device, etc.). In one example, the process 800 can be performed by the user device 210 of FIG. 2. In another example, the process 800 can be performed by a computing device with the computing system 900 shown in FIG. 9. For instance, a computing device with the computing architecture shown in FIG. 9 can include the components of the user device 210 of FIG. 2 and can implement the operations of FIG. 8.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
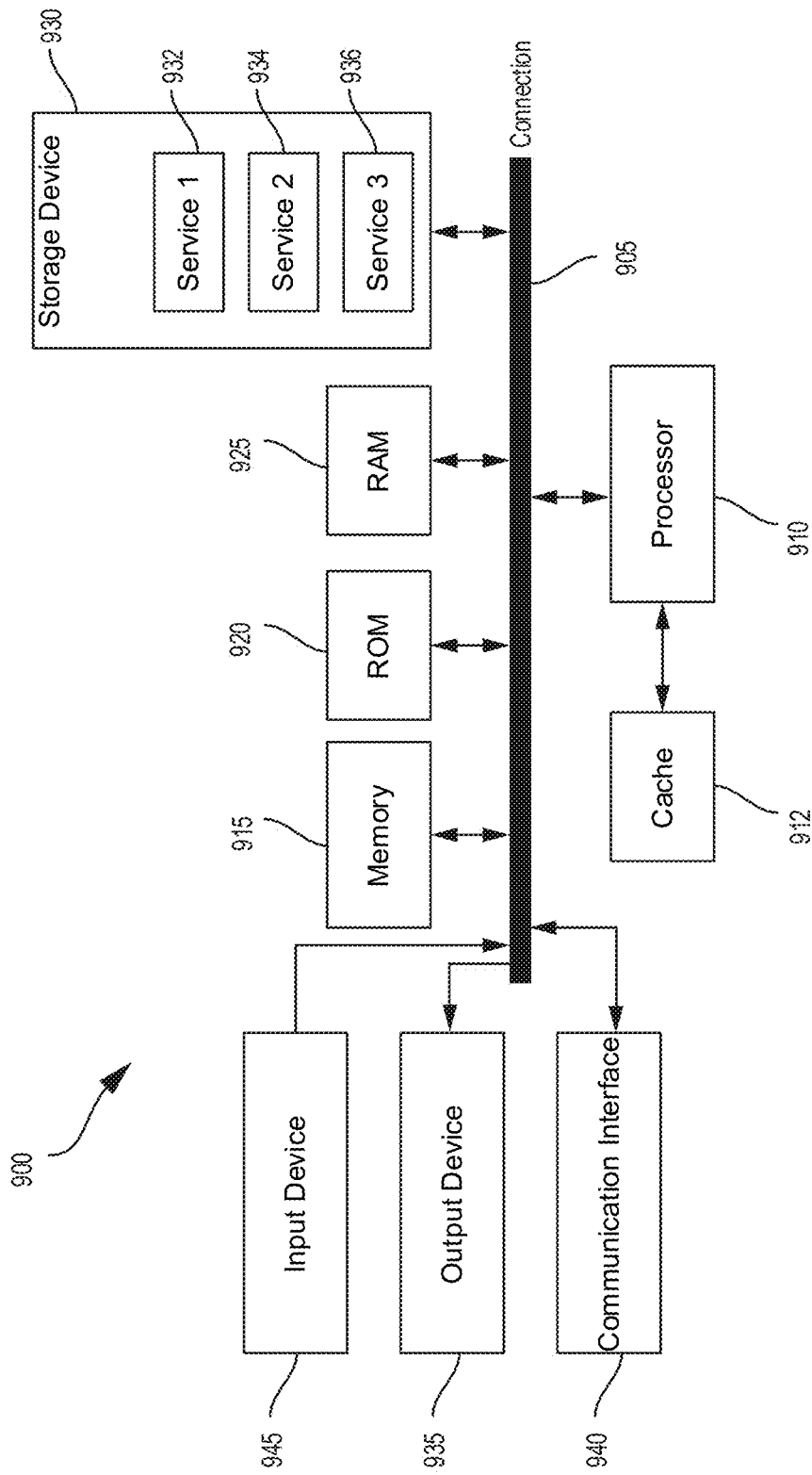
FIG. 9 is a block diagram illustrating an example of a computing system, in accordance with some examples of the present disclosure.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900.

Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 902.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data.

A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1: An apparatus comprising: at least one memory; and one or more processors coupled to the at least one memory and configured to: obtain radio frequency (RF) sensing data; determine, based on the RF sensing data, one or more reflected paths of one or more reflected RF signals, wherein each reflected RF signal comprises a reflection of a transmitted RF signal from one or more objects in a physical space; compare the one or more reflected paths to a field-of-view (FOV) of an image capturing device associated with the apparatus; and based on the comparison, trigger an action by at least one of the apparatus and the image capturing device.

Aspect 2: The apparatus of any of Aspects 1, wherein the one or more processors are configured to: determine, based on the comparison, that the one or more objects are outside of the FOV of the image capturing device; and based on determining that the one or more objects are outside of the FOV of the image capturing device, set a power setting of the image capturing device to an adjusted power state that is lower than a different power state associated with the image capturing device when the one or more objects are within a portion of a scene corresponding to the FOV of the image capturing device.

Aspect 3: The apparatus of Aspect 2, wherein the one or more processors are configured to: determine that the one or more objects are moving towards the portion of the scene corresponding to the FOV of the image capturing device; and based on determining that the one or more objects are moving towards the portion of the scene corresponding to the FOV of the image capturing device, adjust the power setting of the image capturing device to the different power state.

Aspect 4: The apparatus of any of Aspects 1 to 3, wherein the one or more processors are configured to: determine that a view of the image capturing device to the one or more objects is obstructed by at least one object; and based on determining that the view of the image capturing device to the one or more objects is obstructed by at least one object, set a power setting of the image capturing device to an adjusted power state that is lower than a different power state associated with the image capturing device when the one or more objects are within a portion of a scene corresponding to the FOV of the image capturing device, wherein triggering the action is further based on the determining that the view of the image capturing device to the one or more objects is obstructed.

Aspect 5: The apparatus of Aspect 4, wherein to determine that the view of the image capturing device to the one or more objects is obstructed by at least one object, the one or more processors are further configured to: determine, based on the comparison, that the one or more objects are within the portion of the scene corresponding to the FOV of the image capturing device; and determine, based on a location of the one or more objects, that a view of the image capturing device to the one or more objects is obstructed by the at least one object.

Aspect 6: The apparatus of any of Aspects 1 to 5, wherein the image capturing device comprises a plurality of image sensors, wherein the triggered action comprises controlling a power setting of the image capturing device, and wherein to control the power setting of the image capturing device, the one or more processors are configured to control individual power settings of the plurality of image sensors.

Aspect 7: The apparatus of Aspect 6, wherein, to control individual power settings of the plurality of image sensors, the one or more processors are configured to dedicate, based on determining that the hand is within an FOV of a particular one of the plurality of image sensors, at least one of a plurality of processors of the apparatus to the particular one of the plurality of image sensors for image processing.

Aspect 8: The apparatus of any of Aspects 1 to 7, wherein the one or more processors are configured to: control, based on determining that the one or more objects are outside of the FOV of the image capturing device, a use of a plurality of image capturing devices of the apparatus by a plurality of processors of the apparatus, the plurality of image capturing devices including the image capturing device.

Aspect 9: The apparatus of Aspect 7, wherein, to control the use of the plurality of image capturing devices by the plurality of processors, the one or more processors are configured to dedicate, to one of the plurality of processors, a particular one of the plurality of image capturing devices that was previously shared by two or more of the plurality of processors.

Aspect 10: The apparatus of Aspect 7, wherein each of the plurality of processors comprises an image signal processor, and wherein each of the plurality of image capturing devices comprises an image sensor.

Aspect 11: The apparatus of any of Aspects 1 to 10, wherein the one or more processors are configured to: determine, based on the comparison, that the one or more objects are outside of the FOV of the image capturing device and moving towards a portion of a scene corresponding to the FOV of the image capturing device; and in response to determining that the one or more objects are outside of the FOV of the image capturing device and moving towards the portion of the scene corresponding to the FOV of the image capturing device, switch an active camera setting from the image capturing device to a different image capturing device, the switched active camera setting triggering the apparatus to use the different image capturing device to capture one or more images.

Aspect 12: The apparatus of any of Aspects 1 to 11, wherein at least one of the one or more objects comprises a hand associated with a user of the apparatus.

Aspect 13: The apparatus of any of Aspects 1 to 12, wherein the one or more processors are configured to: determine paths of RF signals comprising a direct path of the transmitted RF signal; and determine a location of the one or more objects relative to the apparatus based on the paths of the RF signals.

Aspect 14: The apparatus of any of Aspects 1 to 13, wherein the one or more processors are configured to determine at least one of a respective distance, a respective azimuth angle, and a respective elevation angle associated with the one or more reflected paths; and based on at least one of the respective distance, the respective azimuth angle, and the respective elevation angle, determine a location of the one or more objects relative to the apparatus.

Aspect 15: The apparatus of any of Aspects 1 to 14, wherein the triggered action comprises controlling a power setting of the image capturing device, and wherein controlling the power setting of the image capturing device is further based on a light level being below a threshold.

Aspect 16: The apparatus of any of Aspects 1 to 14, wherein the triggered action comprises controlling a power setting of the image capturing device, and wherein controlling the power setting of the image capturing device is further based on a privacy setting, wherein the privacy setting is based on at least one of a user input, application data, and global navigation satellite system (GNSS) data.

Aspect 17: The apparatus of any of Aspects 1 to 16, wherein the one or more processors are configured to: determine, based on the RF sensing data and the one or more reflected paths, at least one of a size and shape of the one or more objects.

Aspect 18: The apparatus of any of Aspects 1 to 17, wherein the one or more processors are configured to: determine, based on the RF sensing data and the one or more reflected paths, a shape of an object from the one or more objects; determine, based on the shape of the object, that the object comprises a hand associated with a user of the apparatus; and generate, using an image captured by the image capturing device, a cropped image of the hand.

Aspect 19: The apparatus of Aspect 18, wherein the one or more processors are configured to: determine a location of the one or more objects relative to the apparatus based on the one or more reflected paths; wherein the cropped image is generated based on the location of the one or more objects, and wherein the location of the one or more objects comprises a hand location.

Aspect 20: The apparatus of Aspect 18, wherein the one or more processors are configured to: select the at least one of the one or more reflected paths from the one or more reflected paths based on a respective distance of an associated object being within a distance threshold.

Aspect 21: The apparatus of Aspect 18, wherein the one or more processors are configured to: send the cropped image to a destination device.

Aspect 22: The apparatus of Aspect 21, wherein the destination device comprises at least one of server and a mobile device, and wherein the apparatus comprises an extended reality device.

Aspect 23: The apparatus of any of Aspects 1 to 22, wherein at least one of the one or more objects comprises a hand of a user of the apparatus, and wherein the one or more processors are configured to: determine, based on the RF sensing data and the one or more reflected paths, at least one of a map of the physical space and a hand gesture associated with the hand of the user.

Aspect 24: The apparatus of any of Aspects 1 to 23, wherein the triggered action comprises extracting a portion of an image that contains the one or more objects.

Aspect 25: The apparatus of any of Aspects 1 to 24, wherein the triggered action comprises determining whether to capture one or more images of the one or more objects, the triggered action being further based on a determination that the one or more objects are within a portion of a scene corresponding to the FOV of the image capturing device.

Aspect 26: The apparatus of any of Aspects 1 to 25, wherein the apparatus comprises an augmented reality device.

Aspect 27: The apparatus of Aspect 26, wherein the augmented reality device comprises a head-mounted display.

Aspect 28: The apparatus of any of Aspects 1 to 27, wherein the one or more processors are configured to: detect, using a machine learning algorithm, at least one of a hand associated with a user of the apparatus and an obstruction of a view of the image capturing device to the hand, wherein the hand comprises at least one of the one or more objects.

Aspect 29: The apparatus of any of Aspects 1 to 28, wherein the RF sensing data comprises channel state information (CSI) data.

Aspect 30: The apparatus of any of Aspects 1 to 29, wherein the apparatus comprises a mobile device.

Aspect 31: The apparatus of any of Aspects 1 to 30, wherein the mobile device comprises a wearable device.

Aspect 32: The apparatus of any of Aspects 1 to 31, wherein the transmitted RF signal comprises a downlink physical layer protocol data unit (DL-PPDU) from a destination device.

Aspect 33: The apparatus of any of Aspects 1 to 32, wherein the transmitted RF signal comprises a Wi-Fi radar signal.

Aspect 34: A method comprising: obtaining radio frequency (RF) sensing data; determining, based on the RF sensing data, one or more reflected paths of one or more reflected RF signals, wherein each reflected RF signal comprises a reflection of a transmitted RF signal from one or more objects in a physical space; comparing the one or more reflected paths to a field-of-view (FOV) of an image capturing device associated with a mobile device; and based on the comparison, triggering an action by at least one of the image capturing device and the mobile device.

Aspect 35: The method of Aspect 34, further comprising: based on the comparison, determining that the one or more objects are outside of the FOV of the image capturing device; and based on determining that the one or more objects are outside of the FOV of the image capturing device, setting a power setting of the image capturing device to an adjusted power state that is lower than a different power state associated with the image capturing device when the one or more objects are within a portion of a scene corresponding to the FOV of the image capturing device.

Aspect 36: The method of Aspect 35, further comprising: determining that the one or more objects are moving towards the portion of the scene corresponding to the FOV of the image capturing device; and based on determining that the one or more objects are moving towards the portion of the scene corresponding to the FOV of the image capturing device, adjusting the power setting of the image capturing device to the different power state.

Aspect 37: The method of any of Aspects 34 to 36, further comprising: determining that a view of the image capturing device to the one or more objects is obstructed by at least one object; and based on determining that the view of the image capturing device to the one or more objects is obstructed by at least one object, setting a power setting of the image capturing device to an adjusted power state that is lower than a different power state associated with the image capturing device when the one or more objects are within a portion of a scene corresponding to the FOV of the image capturing device, wherein triggering the action is further based on the determining that the view of the image capturing device to the one or more objects is obstructed.

Aspect 38: The method of Aspect 37, wherein determining that the view of the image capturing device to the one or more objects is obstructed by at least one object further comprises: determining, based on the comparison, that the one or more objects are within the portion of the scene corresponding to the FOV of the image capturing device; and determining, based on a location of the one or more objects, that a view of the image capturing device to the one or more objects is obstructed by the at least one object.

Aspect 39: The method of any of Aspects 34 to 38, wherein the image capturing device comprises a plurality of image sensors, wherein the triggered action comprises controlling a power setting of the image capturing device, and wherein controlling the power setting of the image capturing device further comprises controlling individual power settings of the plurality of image sensors.

Aspect 40: The method of any of Aspects 34 to 39, wherein controlling individual power settings of the plurality of image sensors further comprises dedicating, based on determining that the hand is within an FOV of a particular one of the plurality of image sensors, at least one of a plurality of processors of the mobile device to the particular one of the plurality of image sensors for image processing.

Aspect 41: The method of any of Aspects 34 to 40, further comprising: controlling, based on a determination that the one or more objects are outside of the FOV of the image capturing device, a use of a plurality of image capturing devices of the mobile device by a plurality of processors of the mobile device, the plurality of image capturing devices including the image capturing device.

Aspect 42: The apparatus of Aspect 41, wherein, to control the use of the plurality of image capturing devices by the plurality of processors, the one or more processors are configured to dedicate, to one of the plurality of processors, a particular one of the plurality of image capturing devices that was previously shared by two or more of the plurality of processors.

Aspect 43: The apparatus of Aspect 41, wherein each of the plurality of processors comprises an image signal processor, and wherein each of the plurality of image capturing devices comprises an image sensor.

Aspect 44: The method of any of Aspects 34 to 43, further comprising: determining that the one or more objects are outside of the FOV of the image capturing device and moving towards a portion of a scene corresponding to the FOV of the image capturing device; and in response to determining that the one or more objects are outside of the FOV of the image capturing device and moving towards the portion of the scene corresponding to the FOV of the image capturing device, switching an active camera setting from the image capturing device to a different image capturing device, the switched active camera setting triggering the mobile device to use the different image capturing device to capture one or more images.

Aspect 45: The method of any of Aspects 34 to 44, wherein at least one of the one or more objects comprises a hand associated with a user of the mobile device.

Aspect 46: The method of any of Aspects 34 to 45, further comprising: determining paths of RF signals comprising a direct path of the transmitted RF signal; and determining a location of the one or more objects relative to the mobile device based on the paths of the RF signals.

Aspect 47: The method of any of Aspects 34 to 46, further comprising: determining at least one of a respective distance, a respective azimuth angle, and a respective elevation angle associated with the one or more reflected paths; and based on at least one of the respective distance, the respective azimuth angle, and the respective elevation angle, determining the location of the one or more objects relative to the mobile device.

Aspect 48: The method of any of Aspects 34 to 47, wherein the triggered action comprises controlling a power setting of the image capturing device, and wherein controlling the power setting of the image capturing device is further based on a light level being below a threshold.

Aspect 49: The method of any of Aspects 34 to 47, wherein the triggered action comprises controlling a power setting of the image capturing device, and wherein controlling the power setting of the image capturing device is further based on a privacy setting, wherein the privacy setting is based on at least one of a user input, application data, and global navigation satellite system (GNSS) data.

Aspect 50: The method of any of Aspects 34 to 49, further comprising: determining, based on the RF sensing data and the one or more reflected paths, at least one of a size and shape of the one or more objects.

Aspect 51: The method of any of Aspects 34 to 50, further comprising: determining, based on the RF sensing data and the one or more reflected paths, a shape of an object from the one or more objects; determining, based on the shape of the object, that the object comprises a hand associated with a user of the mobile device; generating, using an image captured by the image capturing device, a cropped image of the hand.

Aspect 52: The method of Aspect 51, further comprising: determining a location of the one or more objects relative to the mobile device based on the one or more reflected paths; wherein the cropped image is generated based on the location of the one or more objects, and wherein the location of the one or more objects comprises a hand location.

Aspect 53: The method of Aspect 51, further comprising: selecting the at least one of the one or more reflected paths from the one or more reflected paths based on a respective distance of an associated object being within a distance threshold.

Aspect 54: The method of Aspect 51, further comprising: sending the cropped image to a destination device.

Aspect 55: The method of Aspect 54, wherein the destination device comprises at least one of server and a mobile device, and wherein the mobile device comprises an extended reality device.

Aspect 56: The method of any of Aspects 34 to 55, wherein at least one of the one or more objects comprises a hand of a user of the mobile device, the method further comprising: determining, based on the RF sensing data and the one or more reflected paths, at least one of a map of the physical space and a hand gesture associated with the hand of the user.

Aspect 57: The method of any of Aspects 34 to 55, wherein the triggered action comprises extracting a portion of an image that contains the one or more objects.

Aspect 58: The method of any of Aspects 34 to 57, wherein the triggered action comprises determining whether to capture one or more images of the one or more objects, the triggered action being further based on a determination that the one or more objects are within a portion of a scene corresponding to the FOV of the image capturing device.

Aspect 59: The method of any of Aspects 34 to 58, further comprising: detecting, using a machine learning algorithm, at least one of a hand associated with a user of the mobile device and an obstruction of a view of the image capturing device to the hand, wherein the hand comprises at least one of the one or more objects.

Aspect 60: A non-transitory computer-readable medium having stored thereon instructions which, when executed by one or more processors, cause the one or more processors to perform a method according to any of Aspects 34 to 58.

Aspect 61: An apparatus comprising means for performing a method according to any of Aspects 34 to 58.

Aspect 62: The apparatus of Aspect 61, wherein the apparatus comprises an augmented reality device.

Aspect 63: The apparatus of Aspect 62, wherein the augmented reality device comprises a head-mounted display.

Aspect 64: The apparatus of Aspect 61, wherein the apparatus comprises a mobile device.

Aspect 65: The apparatus of Aspect 61, wherein the apparatus comprises a wearable device.

What is claimed is:

1. An apparatus comprising:
   at least one memory; and
   one or more processors coupled to the at least one memory and configured to:
      obtain radio frequency (RF) sensing data;
      determine, based on the RF sensing data, one or more reflected paths of one or more reflected RF signals, wherein each reflected RF signal comprises a reflection of a transmitted RF signal from one or more hands of a user of the apparatus in a physical space;
      determine a location of each hand of the one or more hands relative to the apparatus based on the one or more reflected paths of the one or more reflected RF signals;
      determine that a location of a hand of the one or more hands determined based on the one or more reflected paths is within a threshold distance of a field-of-view (FOV) of an image capturing device associated with the apparatus; and
      based on determining that the location of the hand is within the threshold distance of the FOV of the image capturing device, trigger an action by the apparatus, wherein the action includes sending image data of the hand to a destination device, wherein the image data is based on an image captured by the image capturing device.

2. The apparatus of claim 1, wherein the one or more processors are configured to:
   determine that hand is outside of the FOV of the image capturing device; and
   based on determining that the hand is outside of the FOV of the image capturing device, set a power setting of the image capturing device to an off state or an adjusted power state that is lower than a different power state associated with the image capturing device when the one or more hands are within the threshold distance of the FOV of the image capturing device.

3. The apparatus of claim 2, wherein the one or more processors are configured to:
   determine that the hand is moving towards the FOV of the image capturing device; and
   based on determining that the hand is moving towards the FOV of the image capturing device, adjust the power setting of the image capturing device to the different power state.

4. The apparatus of claim 1, wherein the one or more processors are configured to:
   determine that a view of the image capturing device to the hand is obstructed by at least one object; and
   based on determining that the view of the image capturing device to the hand is obstructed by at least one object, set a power setting of the image capturing device to an adjusted power state that is lower than a different power state associated with the image capturing device when the one or more hands are within the FOV of the image capturing device.

5. The apparatus of claim 4, wherein to determine that the view of the image capturing device to the hand is obstructed by the at least one object, the one or more processors are further configured to:
   determine that the hand is within the threshold distance of the FOV of the image capturing device; and
   determine, based on a location of the hand, that the view of the image capturing device to the hand is obstructed by the at least one object.

6. The apparatus of claim 1, wherein the image capturing device comprises a plurality of image sensors, wherein the action further comprises controlling a power setting of the image capturing device, and wherein to control the power setting of the image capturing device, the one or more processors are configured to control individual power settings of the plurality of image sensors.

7. The apparatus of claim 6, wherein, to control individual power settings of the plurality of image sensors, the one or more processors are configured to dedicate, based on determining that a hand associated with a user of the apparatus is within an FOV of a particular one of the plurality of image sensors, at least one of a plurality of processors of the apparatus to the particular one of the plurality of image sensors for image processing.

8. The apparatus of claim 1, wherein the one or more processors are configured to:
   control, based on determining that the hand is outside of the FOV of the image capturing device, a use of a plurality of image capturing devices of the apparatus by a plurality of processors of the apparatus, the plurality of image capturing devices including the image capturing device.

9. The apparatus of claim 1, wherein the one or more processors are configured to:
   determine that the hand is outside of the FOV of the image capturing device and moving towards a portion of a scene included within the FOV of the image capturing device; and
   in response to determining that the hand is outside of the FOV of the image capturing device and moving towards the FOV of the image capturing device, switch an active camera setting from the image capturing device to a different image capturing device, the switched active camera setting triggering the apparatus to use the different image capturing device to capture one or more images.

10. The apparatus of claim 1, wherein the one or more processors are configured to:
    determine paths of RF signals comprising a direct path of the transmitted RF signal; and
    determine the location of the hand relative to the apparatus based on the paths of the RF signals.

11. The apparatus of claim 1, wherein the one or more processors are configured to:
    determine at least one of a respective distance, a respective azimuth angle, or a respective elevation angle associated with the one or more reflected paths; and
    determine the location of the hand based on at least one of the respective distance, the respective azimuth angle, or the respective elevation angle associated with the one or more reflected paths.

12. The apparatus of claim 1, wherein the action further comprises controlling a power setting of the image capturing device, and wherein the one or more processors are configured to control the power setting of the image capturing device based on a light level being below a threshold.

13. The apparatus of claim 1, wherein the action further comprises controlling a power setting of the image capturing device, wherein the one or more processors are configured to control the power setting of the image capturing device based on privacy setting, and wherein the privacy setting is based on global navigation satellite system (GNSS) data.

14. The apparatus of claim 1, wherein the one or more processors are configured to:
    determine, based on the RF sensing data and the one or more reflected paths, at least one of a size or shape of the hand.

15. The apparatus of claim 1, wherein the one or more processors are configured to:
    determine, based on the RF sensing data and the one or more reflected paths, a shape of an object in the physical space;
    determine, based on the shape of the object, that the object comprises the hand; and
    generate, using the image captured by the image capturing device, a cropped image of the hand.

16. The apparatus of claim 15, wherein the one or more processors are configured to generate the cropped image based on the location of the hand, wherein the location of the hand comprises a hand location.

17. The apparatus of claim 15, wherein the one or more processors are configured to:
    select at least one reflected path from the one or more reflected paths based on a distance of the hand being within a distance threshold.

18. The apparatus of claim 15, wherein, to send the image data to the destination device, the one or more processors are configured to send the cropped image to the destination device.

19. The apparatus of claim 18, wherein the destination device comprises at least one of a server or a mobile device, and wherein the apparatus comprises an extended reality device.

20. The apparatus of claim 1, wherein the one or more processors are configured to:
    determine, based on the RF sensing data and the one or more reflected paths, at least one of a map of the physical space or a hand gesture associated with the hand of the user.

21. The apparatus of claim 1, wherein the action further comprises extracting a portion of at least one image that contains the hand.

22. The apparatus of claim 1, wherein the one or more processors are configured to determine whether to capture the image of the hand using the image capturing device based on determining that the location of the hand is within the threshold distance of the FOV of the image capturing device.

23. The apparatus of claim 1, wherein the apparatus comprises an augmented reality device.

24. The apparatus of claim 23, wherein the augmented reality device comprises a head-mounted display.

25. The apparatus of claim 1, wherein the one or more processors are configured to:
    detect, using a machine learning algorithm, at least one of the hand or an obstruction of a view of the image capturing device to the hand.

26. A method comprising:
    at least one memory; and
    one or more processors coupled to the at least one memory and configured to:
    obtaining radio frequency (RF) sensing data;

determining, based on the RF sensing data, one or more reflected paths of one or more reflected RF signals, wherein each reflected RF signal comprises a reflection of a transmitted RF signal from one or more hands of a user of a mobile device in a physical space;

determining a location of each hand of the one or more hands relative to the mobile device based on the one or more reflected paths of the one or more reflected RF signals;

determining that a location of a hand of the one or more hands determined based on the one or more reflected paths is within a threshold distance of a field-of-view (FOV) of an image capturing device associated with the mobile device; and based on determining that the location of the hand is within the threshold distance of the FOV of the image capturing device, trigger an action by the mobile device, wherein the action includes sending image data of the hand to a destination device, wherein the image data is based on an image captured by the image capturing device.

27. The method of claim 26, further comprising:
determining that hand is outside of the FOV of the image capturing device; and
based on determining that the hand is outside of the FOV of the image capturing device, setting a power setting of the image capturing device to an off state or an adjusted power state that is lower than a different power state associated with the image capturing device when the one or more hands are within the threshold distance of the FOV of the image capturing device.

28. The method of claim 27, further comprising:
determining that the hand is moving towards the FOV of the image capturing device; and
based on determining that the hand is moving towards the FOV of the image capturing device, adjusting the power setting of the image capturing device to the different power state.

29. The method of claim 26, further comprising:
determining that a view of the image capturing device to the hand is obstructed by at least one object; and
based on determining that the view of the image capturing device to the hand is obstructed by at least one object, setting a power setting of the image capturing device to an adjusted power state that is lower than a different power state associated with the image capturing device when the one or more hands are within the FOV of the image capturing device.

30. The method of claim 29, wherein determining that the view of the image capturing device to the hand is obstructed by the at least one object further comprises:
determining that the hand is within the threshold distance of the FOV of the image capturing device; and
determining, based on a location of the hand, that the view of the image capturing device to the hand is obstructed by the at least one object.

31. The method of claim 26, wherein the image capturing device comprises a plurality of image sensors, the action further comprises controlling a power setting of the image capturing device, and wherein controlling the power setting of the image capturing device further comprises controlling individual power settings of the plurality of image sensors.

32. The method of claim 31, wherein controlling individual power settings of the plurality of image sensors further comprises dedicating, based on determining that a hand associated with a user of the mobile device is within an FOV of a particular one of the plurality of image sensors, at least one of a plurality of processors of the mobile device to the particular one of the plurality of image sensors for image processing.

33. The method of claim 26, further comprising:
controlling, based on a determination that the hand is outside of the FOV of the image capturing device, a use of a plurality of image capturing devices of the mobile device by a plurality of processors of the mobile device, the plurality of image capturing devices including the image capturing device.

34. The method of claim 26, further comprising:
determining that the hand is outside of the FOV of the image capturing device and moving towards a portion of a scene included within the FOV of the image capturing device; and
in response to determining that the hand is outside of the FOV of the image capturing device and moving towards the FOV of the image capturing device, switching an active camera setting from the image capturing device to a different image capturing device, the switched active camera setting triggering the mobile device to use the different image capturing device to capture one or more images.

35. The method of claim 26, further comprising:
determining paths of RF signals comprising a direct path of the transmitted RF signal; and
determining the location of the hand relative to the mobile device based on the paths of the RF signals.

36. The method of claim 35, further comprising:
determining at least one of a respective distance, a respective azimuth angle, or a respective elevation angle associated with the one or more reflected paths; and
determine the location of the hand based on at least one of the respective distance, the respective azimuth angle, or the respective elevation angle associated with the one or more reflected paths.

37. The method of claim 26, wherein the action further comprises controlling a power setting of the image capturing device based on a light level being below a threshold.

38. The method of claim 26, wherein the action further comprises controlling a power setting of the image capturing device based on a privacy setting, wherein the privacy setting is based on global navigation satellite system (GNSS) data.

39. The method of claim 26, further comprising:
determining, based on the RF sensing data and the one or more reflected paths, at least one of a size or shape of the hand.

40. The method of claim 26, further comprising:
determining, based on the RF sensing data and the one or more reflected paths, a shape of an object in the physical space;
determining, based on the shape of the object, that the object comprises the hand; and
generating, using the image captured by the image capturing device, a cropped image of the hand.

41. The method of claim 40, further comprising generating the cropped image based on the location of the hand, and wherein the location of the hand comprises a hand location.

42. The method of claim 40, further comprising:
selecting at least one reflected path from the one or more reflected paths based on a distance of the hand being within a distance threshold.

43. The method of claim 40, wherein sending the image data to the destination device comprises sending the cropped image to the destination device.

44. The method of claim 43, wherein the destination device comprises at least one of a server or a mobile device, and wherein the mobile device comprises an extended reality device.

45. The method of claim 26, further comprising:
determining, based on the RF sensing data and the one or more reflected paths, at least one of a map of the physical space or a hand gesture associated with the hand of the user.

46. The method of claim 26, wherein the action further comprises extracting a portion of at least one image that contains the hand.

47. The method of claim 26, further comprising determining whether to capture the image of the hand using the image capturing device based on determining that the location of the hand is within the threshold distance of the FOV of the image capturing device.

48. The method of claim 26, further comprising:
detecting, using a machine learning algorithm, at least one of the hand or an obstruction of a view of the image capturing device to the hand.

49. A non-transitory computer-readable medium having stored thereon instructions which, when executed by one or more processors, cause the one or more processors to:

obtain radio frequency (RF) sensing data;

determine, based on the RF sensing data, one or more reflected paths of one or more reflected RF signals, wherein each reflected RF signal comprises a reflection of a transmitted RF signal from one or more hands of a user of a mobile device in a physical space;

determine a location of each hand of the one or more hands relative to the mobile device based on the one or more reflected paths of the one or more reflected RF signals;

determine that a location of a hand of the one or more hands determined based on the one or more reflected paths is within a threshold distance of a field-of-view (FOV) of an image capturing device; and based on determining that the location of the hand is within the threshold distance of the FOV of the image capturing device, trigger an action, wherein the action includes sending image data of the hand to a destination device, wherein the image data is based on an image captured by the image capturing device.

* * * * *